US009244492B2

(12) United States Patent
Schneider et al.

(10) Patent No.: US 9,244,492 B2
(45) Date of Patent: Jan. 26, 2016

(54) DOCKING STATION WITH AUDIO OUTPUT

(71) Applicant: Apple Inc., Cupertino, CA (US)

(72) Inventors: Gerhard A. Schneider, Cupertino, CA (US); Scott Krueger, San Francisco, CA (US); Robert D. Watson, Santa Clara, CA (US); Alexei Kosut, Mountain View, CA (US); Tony Chi Wang Ng, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 124 days.

(21) Appl. No.: 14/022,015

(22) Filed: Sep. 9, 2013

(65) Prior Publication Data

US 2015/0070832 A1    Mar. 12, 2015

(51) Int. Cl.
*G06F 1/16* (2006.01)
*H04R 3/00* (2006.01)
*G06F 3/16* (2006.01)

(52) U.S. Cl.
CPC ............ *G06F 1/1632* (2013.01); *G06F 1/1684* (2013.01); *G06F 3/162* (2013.01); *H04R 3/00* (2013.01)

(58) Field of Classification Search
USPC ......... 320/111, 106, 107, 100, 114, 109, 112, 320/108; 709/206, 224; 361/679.58, 361/679.08, 679.01, 679.55, 679.3, 679.02, 361/679.21, 679.33, 679.4, 679.04, 679.28, 361/679.46, 679.09, 679.17, 679.41, 361/679.44, 679.43, 679.56, 679.42, 361/679.26, 679.27, 679.23; 429/179, 100, 429/99, 7, 178, 123, 176; 439/533, 529, 439/660, 38, 101, 499, 248, 371, 222, 165, 439/39, 345, 297; 455/557, 66.1, 415, 573, 455/556.1, 565, 74.1, 418, 416, 552.1, 419, 455/566, 41.1; 345/473, 419, 633, 619, 345/173, 156, 158, 413, 1.1, 169, 503, 184
See application file for complete search history.

(56) References Cited

U.S. PATENT DOCUMENTS 8,117,651 B2    2/2012    Novotney et al.
8,708,745 B2    4/2014    Golko et al.
(Continued)

FOREIGN PATENT DOCUMENTS

EP    2 634 724 A1    9/2013
TW    M403838 U    5/2011

OTHER PUBLICATIONS

International Search Report and Written Opinion of the International Searching Authority mailed on Oct. 29, 2014 for PCT Patent Application No. PCT/US2014/052463, 12 pages.
(Continued)

*Primary Examiner* — Hung Duong
(74) *Attorney, Agent, or Firm* — Kilpatrick Townsend & Stockton LLP

(57) ABSTRACT

Docking stations that may interface with various types of accessories. One example may physically and electrically support a connection to a portable computing device in either one or two orientations. One or more receptacles or dedicated or tethered cables may provide connections to one or more accessories. Examples may be able to authenticate and identify themselves to portable computing devices such that the devices know how to configure data outputs provided to the docking stations. An audio channel that converts digital audio signals and provides an analog audio signal at an audio jack may be included. Multiplexing circuitry that allows reversible connectors to be used may also be included.

20 Claims, 19 Drawing Sheets

(56) References Cited

U.S. PATENT DOCUMENTS

| | | |
|---|---|---|
| 2007/0204174 A1 | 8/2007 | Dorogusker et al. |
| 2010/0033127 A1* | 2/2010 | Griffin et al. ............... 320/111 |
| 2010/0067197 A1 | 3/2010 | Guccione et al. |
| 2011/0035491 A1* | 2/2011 | Gelvin et al. ............... 709/224 |
| 2011/0167187 A1 | 7/2011 | Crumlin et al. |
| 2011/0299238 A1 | 12/2011 | Radin et al. |
| 2012/0096207 A1* | 4/2012 | Chen ............................ 710/303 |
| 2013/0244489 A1 | 9/2013 | Terlizzi et al. |
| 2013/0332542 A1* | 12/2013 | Foo et al. ..................... 709/206 |
| 2014/0163664 A1* | 6/2014 | Goldsmith .................. 623/1.11 |
| 2014/0223037 A1 | 8/2014 | Minoo et al. |
| 2014/0239895 A1 | 8/2014 | Arendell |

OTHER PUBLICATIONS

Jeremy Horwitz: "Review: Apple Universal Dock (2010)," Mar. 7, 2011, pp. 1-6, XP055147739, Retrieved from the internet: URL:http://www.ilounge.com/index.php/reviews/entry/apple-universal-dock-2010/[retreived on Oct. 20, 2014].

International Search Report and Written Opinion of the International Searching Authority mailed on Nov. 18, 2014 for PCT Patent Application No. PCT/US2014/052702, 14 pages.

* cited by examiner

DOCKING STATION WITH AUDIO OUTPUT

BACKGROUND

Portable computing devices, such as smartphones, music and video players, and others have become ubiquitous. The features and capabilities of these players have increased as well. As a result, the numbers and types of accessory devices that these players may communicate with have grown at a remarkable rate.

At the same time, it is often desirable to have docking stations that may be used to physically support these portable computing devices and to have the docking stations provide power to charge batteries in the portable computing devices to and provide connection points that may be used to connect accessories to the portable computing devices.

Thus, what is needed are portable computing device docking stations that may facilitate communication with various accessory devices.

SUMMARY

Accordingly, embodiments of the present invention may provide docking stations for smart phones or other portable computing devices. These docking stations may facilitate communication with one or more various accessory devices.

An illustrative embodiment of the present invention may provide docking stations having connectors to mate with a smart phone or other portable computing device and one or more accessories. These docking stations may provide physical support for portable computing devices, or they may connect to portable computing devices using cables or other wired connections, wireless connections, or combination thereof. These docking stations may connect to one or more accessories using one or more receptacles on the docking stations, by using dedicated cables, by using wireless connections, or combination thereof. Data may be transferred between a docking station and a portable computing device, between a docking station and an accessory, between a portable computing device and an accessory via a docking station, or among a docking station, portable computing device, and an accessory. In various configurations of embodiments of the present invention, power may be provided by a portable computing device to one or both of a docking station and accessory, power may be provided by a docking station to one or both of a portable computing device and accessory, or it may be provided by the accessory to one or both of a docking station and portable computing device. For example, the accessory may be a charger that receives power from a wall or car outlet and provides power to a docking station and portable computing device.

An illustrative embodiment of the present invention may provide a docking station having a connector insert for mating with a receptacle on a smart phone or other portable computing device. The connector insert may be in a depression or well, the side or sides of which may provide mechanical support for an inserted smart phone or other portable computing device. The docking station may further include one or more receptacles for communicating with one or more accessories. In other embodiments, one or more receptacles may be replaced with dedicated or tethered cables having a connector insert at a far end. These docking station connector inserts and receptacles may mate with connector receptacles or inserts for various interfaces such as Universal Serial Bus (USB), High-Definition Multimedia Interface® (HDMI), Digital Visual Interface (DVI), power, Ethernet, DisplayPort, Thunderbolt™, Lightning™ and other types of standard and non-standard interfaces.

Embodiments of the present invention may provide docking stations connector inserts that may have contacts on one or both sides of the insert. Smart phones and other portable computing devices may have receptacles having contacts only on one side in order to reduce device thickness. Having contacts on both sides of the connector insert may allow portable computing devices to be inserted into the docking station in either of two orientations. In other embodiments of the present invention, a docking station may employ a simplified connector insert having contacts on only one side. In these embodiments, the portable computing device may need to be inserted in a specific one of the two orientations for proper operation. A housing of the docking station may be formed in a shape that ensures that a user inserts the portable computing device in a proper orientation.

Smart phones and other portable computing devices may communicate with one or more accessories using one or more data channels. These data channels may be single-ended or differential. For example, a smart phone may communicate using two differential channels. Four contacts or pins in the portable computing device may be used to convey the two differential signals. In one illustrative embodiment of the present invention, these two differential signals may be received from a smart phone by a connector insert on the docking station, and then passed from the connector insert to a receptacle on the docking station, where they may be available to be connected to by an accessory. In another illustrative embodiment of the present invention, these two differential signals may be received from a smart phone by a connector insert on the docking station, and then passed from the connector insert to dedicated or tethered cable on the docking station, where the cable has a connector insert on the far end that may be inserted into an accessory.

Another illustrative embodiment of the present invention may provide an audio jack. In a specific embodiment of the present invention, an audio plug may be provided on the docking station. This audio plug may be located near a connector insert such that the connector insert and audio plug may be inserted into a smart phone or portable computing device at the same time. Contacts on the audio plug may connect to contacts on an audio jack elsewhere on the docking station. Headphones or other devices may plug into the audio jack.

Various smart phones and other portable computing devices may be unable to communicate with a docking station unless the docking station is able to authenticate itself. This authentication may include identification of the docking station as well. Accordingly, another illustrative embodiment of the present invention may provide docking station having authentication and identification capabilities. This authentication may employ public-key cryptography or other techniques.

This authentication may occur over a data signal path of the smart phone or other portable computing device. But this may consume one of a limited number of data paths that could otherwise be used for communicating with one or more accessories. Accordingly, another illustrative embodiment of the present invention may provide a docking station where authentication and identification may occur over a control pin. This may make an additional data path available for communication with one or more accessories.

In an illustrative embodiment of the present invention, a docking station may identify itself to a smart phone or other portable computing device so that the portable computing device knows how to format data that is provided over the one or more data paths.

In various embodiments of the present invention, this authentication circuit, or other appropriate circuit may read identification and authorization information from an attached accessory. The authentication or other circuit may then instruct the portable computing device how to provide data on the data paths for use by the accessory.

Again, embodiments of the present invention may provide docking stations having audio outputs by including an audio plug that is inserted into an audio jack on a portable computing device. That is, a connector insert plug and an audio plug are both inserted into a portable computing device. But this configuration may be awkward, cause confusion, and have unappealing aesthetics. Accordingly, another illustrative embodiment of the present invention may provide a docking station where a data communication path is used to convey audio information. This audio information may be converted to an analog signal and provided at an audio jack. An audio plug for headphones or other device may be inserted into the audio jack.

Unfortunately, this configuration may consume one of a limited number of data paths. Accordingly, an illustrative embodiment of the present invention may provide a docking station where a data path may provide data both to an internal audio signal path and an external accessory. In one specific embodiment of the present invention, a data path is provided to both a protocol bridge and a connector that may be accessed by an accessory. The protocol bridge receives data on the data path and passes audio data to a digital-to-analog converter, which generates an analog audio signal that is provided to an audio jack. This allows use of the data path for communication with an accessory and provides for an audio output without having to include an audio plug on the docking station.

Embodiments of the present invention may provide docking stations that may connect to accessories using different types of connector interfaces. One such connector interface is the Lightening connector interface. This interface is reversible. That is a Lightening inset may be interested into a Lightening receptacle in two orientations. Accordingly, an illustrative embodiment of the present invention may provide a docking station having a multiplexing circuit to detect orientation of a connection to an accessory and to multiplex power and data lines appropriately.

Other illustrative embodiments of the present invention may provide docking stations with additional features. One specific embodiment of the present invention may provide a docking station that may include various additional input and output devices or components such as light-emitting diodes (LEDs), buttons, touch pads, displays, wireless communication devices, and other types of components. Light-emitting diodes may be used to indicate a charging status of a battery in a portable computing device or accessory. For example, a multi-colored LED may turn a first color to indicate that a charge is occurring and a second color to indicate that charging is complete. Light-emitting diodes may also be used in conjunction with proximity sensors. Specifically, an LED may light when motion near a connector insert is detected. This illumination may assist a user in attaching a portable computing device to a docking station, or it may assist a user in finding buttons, touch pads, or other controls on the docking station. Light-emitting diodes may also be used to indicate status settings, such as do-not-disturb, airplane mode, and alarm status settings. Touch pads or buttons may be used to control playback volume through an audio channel. Touch pads or buttons may be used for snooze or mode select functions, such as to put a portable computing device into a do-not-disturb or airplane mode. A display may be used to indicate time, mode of the device, weather, news, or other data. This data may be retrieved from an accessory, from a portable computer device, from the Internet or a cellular network, or from other source. The display may be used to indicate an alarm or snooze setting, do-not-disturb or airplane settings, and other types of modes and settings. Wireless communications devices may be included and used as remote controls for devices such as coffee makers, thermostats, lighting, and other types of devices. The wireless communication devices may also connect to cellular or Wi-Fi networks to retrieve, provide, or synchronize data. Embodiments of the present invention may also provide docking stations that may include gesture detection. Gesture detection may allow a user to interact with a docking station by simply making hand movements in the proximity of the docking station. For example, gestures may be used to put an alarm in a snooze state, to turn on a display, to show time, date, weather, news, or other information or combination thereof.

Embodiments of the present invention may include connector receptacles or cables and plugs that may connect to various types of accessories, such as storage devices, monitors, power supplies, adapters, and chargers, and other devices. These connectors may provide pathways for signals and power compliant with various interfaces such as Universal Serial Bus (USB), High-Definition Multimedia Interface (HDMI), Digital Visual Interface (DVI), power, Ethernet, DisplayPort, Thunderbolt, Lightning and other types of standard and non-standard interfaces.

Various embodiments of the present invention may incorporate one or more of these and the other features described herein. A better understanding of the nature and advantages of the present invention may be gained by reference to the following detailed description and the accompanying drawings.

DESCRIPTION OF ILLUSTRATIVE EMBODIMENTS

Figure 1:
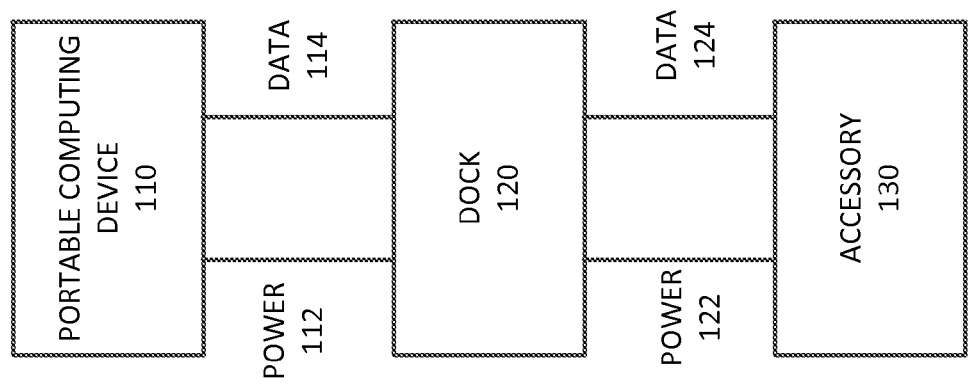
FIG. 1 illustrates an electronic system that may be improved by the incorporation of an embodiment of the present invention.

FIG. 1 illustrates an electronic system that may be improved by the incorporation of an embodiment of the present invention. This figure, as with the other included figures, is shown for illustrative purposes and does not limit either the possible embodiments of the present invention or the claims.

This figure includes portable computing device or host 110, docking station or dock 120, and accessory device or accessory 130. Docking station 120 may provide mechanical support for portable computing device 110. For example, docking station and 20 may have a connector insert that may fit into a corresponding receptacle on portable computing device 110. This insert, along with one or more other support structures, may physically support portable computing device 110 in docking station 120. In other embodiments of the present invention, portable computing device 110 may connect to docking station 120 via a cable, via a wireless connection, or combination thereof. Docking station 120 may further provide mechanical support for accessory 130. Again, docking station 120 may include a connector insert that may be fitted into a receptacle on accessory 130. In other embodiments of the present invention, docking station 120 may include a receptacle for making a connection to accessory 130 via a cable. In still other embodiments of the present invention, docking station may include a dedicated or tethered cable having an insert at a far end that may be inserted in a receptacle in an accessory. Docking station 120 may communicate with accessory 130 via one of these connections, a wireless connection, or combination thereof.

Data may be transferred between docking station 120 and portable computing device 110 via lines 114. Lines 114, as with the other lines shown, may be wired or wireless connections. Similarly, docking station 120 may communicate with accessory 130 via data lines 124. Accessory 130 may communicate through docking station 122 to portable computing device 110 using lines 124 and 114.

Power may be shared among portable computing device 110, docking station 120, and accessory 130 via lines 112 and 122, which again may be wired or wireless connections. For example, portable computing device 110 may include a battery that may provide power to docking station 120 and accessory 130 via lines 112 and 122. Docking station 120 may include or receive power, which may be provided to portable computing device 110 over line 112 and to accessory 130 over line 122. Similarly, accessory 130 may include or receive power, which it may provide to docking station 120 via line 122 and to portable computing device 110 via lines 122 and 112. Power may be transferred between and among portable computing device 110, docking station 120, and one or more accessories 130 using power conductors or other wired connections. Power may also be transferred between devices using wireless paths, for example by using inductive or capacitive charging. In one specific embodiment of the present invention, docking station 120 may provide power to portable computing device 110 by inductive or capacitive charging. In another specific embodiment of the present invention, docking station 120 may provide power to accessory 130 using inductive or capacitive charging, while in another, accessory 130 may provide power to docking station 120 in a wireless manner.

While in this example, docking station 120 is shown as communicating with one accessory 130, in other embodiments of the present invention, docking station 120 may be configured to communicate with two or more accessories. Also, accessories 130 may be daisy-chained to communicate with one or more other accessories, which are not shown for simplicity.

In various embodiments of the present invention, portable computing device 110 may be a smart phone, portable media player, laptop computer, tablet computer, navigational device, a wearable computing device such as a bracelet or pendant, piece of clothing, or the like, or other portable computing device. Accessory 130 may be a charger that receives power from a wall or car outlet, speakers, storage device, projector, camera, monitor, power supply, adapter, or other device.

Again, embodiments of the present invention may provide docking stations that provide mechanical support for a portable computing device. For example, a docking station may include an insert that may be received by a receptacle on portable computing device. The docking station may further include one or more receptacles or dedicated cables which may be used to connect to one or more accessories. These docking stations may include one or more other features such as control buttons, displays, or other features. An example is shown in the following figure.

Figure 2:
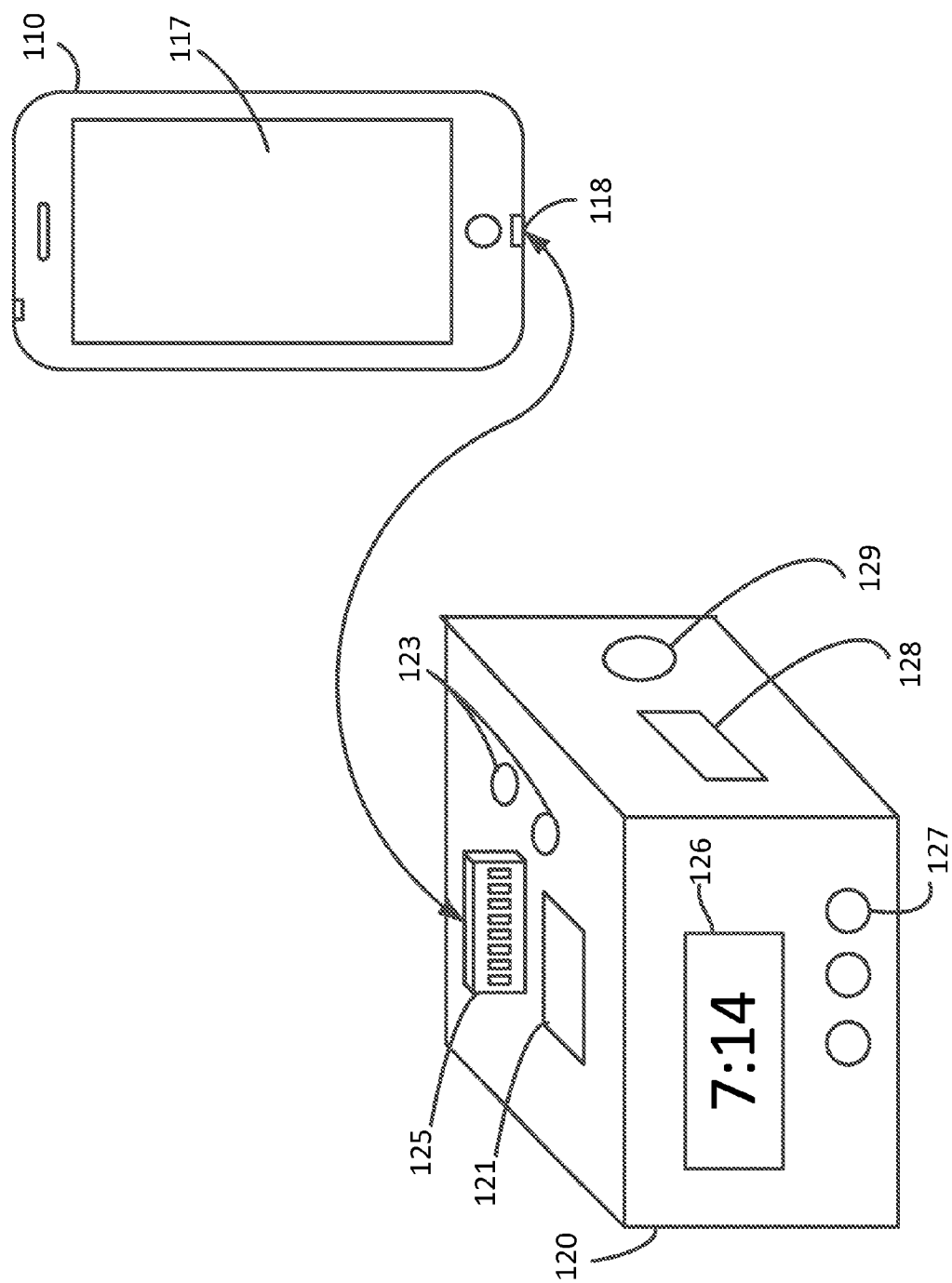
FIG. 2 illustrates a docking station according to an embodiment of the present invention.

FIG. 2 illustrates a docking station according to an embodiment of the present invention. Docking station 120 may include connector insert 125 for mating with receptacle 118 on smart phone or other portable computing device 110. Connector insert 125 may be located in a depression or well (not shown) that may provide mechanical support for smart phone or other portable computing device 110. Connector insert 125 may include a number of contacts to form power and signal paths with corresponding contacts in connector receptacle 118. Docking station 120 may further include one or more receptacles 128 and 129 for communicating with one or more accessories. In a specific embodiment of the present invention, receptacle 128 may be a lightning receptacle, while receptacle 129 may be a headphone jack.

Connector insert 125 may include contacts on one or more sides. Smart phone 110 may typically have contacts only on one side of receptacle 118 in order to save space and to allow smart phone 110 to be thinner. Having contacts on two sides of connector insert 125 may allow smart phone 110 to be inserted in either of two ways in dock station 120. To simplify dock station 120, contacts may be removed or omitted on one side of connector insert 125. In such an embodiment, smart phone 110 may be inserted only one way on dock station 120.

Docking station 120 may be shaped or formed such that smart phone or other portable computing device 110 may fit over connector insert 125 in the one proper orientation to avoid consumer confusion.

Docking station 120 may include various additional components such as light-emitting diodes (LEDs), buttons, touch pads, displays, wireless communication devices, and other types of components.

For example, light-emitting diodes 123 may be used to indicate a charging status of a battery in a portable computing device 110. A multi-colored LED may turn a first color to indicate that a charge is occurring and a second color to indicate that charging is complete. Light-emitting diodes may also be used in conjunction with proximity sensors. Specifically, an LED may light when motion near connector insert 125 is detected. This illumination may assist a user in attaching portable computing device 110 to docking station 120, or it may assist a user in finding buttons, touch pads, or other controls on the docking station. Light-emitting diodes may also be used to indicate status settings, such as do-not-disturb, airplane mode, and alarm status settings.

Touch pads 121 or buttons 127 may be used to control playback volume through an audio channel. Touch pads 121 or buttons 127 may be used for snooze or mode select functions, such as to put a portable computing device into a do-not-disturb or airplane mode.

Display 126 may be used to indicate time, mode of the device, weather, news, or other data. This data may be retrieved from an accessory or from portable computer device 110. Display 126 may be used to indicate an alarm or snooze setting, do-not-disturb or airplane settings, and other types of modes and settings.

Wireless communications devices (not shown) may be included in docking station 120 and used as remote controls for devices such as coffee makers, thermostats, lighting, and other types of devices. The wireless communication devices may also connect to cellular or Wi-Fi networks to retrieve, provide, or synchronize data.

Docking station 120 may also include gesture detection. Gesture detection may allow a user to interact with docking station 120 by simply making hand movements in the proximity of docking station 120. For example, a wave of a hand over docking station 120 may put an alarm in a snooze state. A gesture may be used to turn on a display, either on portable computing device 110 or docking station 120, to show time, date, weather, news, or other information or combination thereof. When viewing news on display 126, a gesture may be used to advance text to a next page. Other docking stations may include other features consistent with embodiments of the present invention.

Smart phones and other portable computing devices may communicate using one or more data channels. For example, smart phone 110 may communicate using two data channels. These data channels may be single-ended or differential. In a specific embodiment of the present invention, smart phone 110 may use four contacts or pads in receptacle 118 to communicate using two differential data channels. An example of a docking station that provides communication over two differential channels is shown in the following figure.

Figure 3:
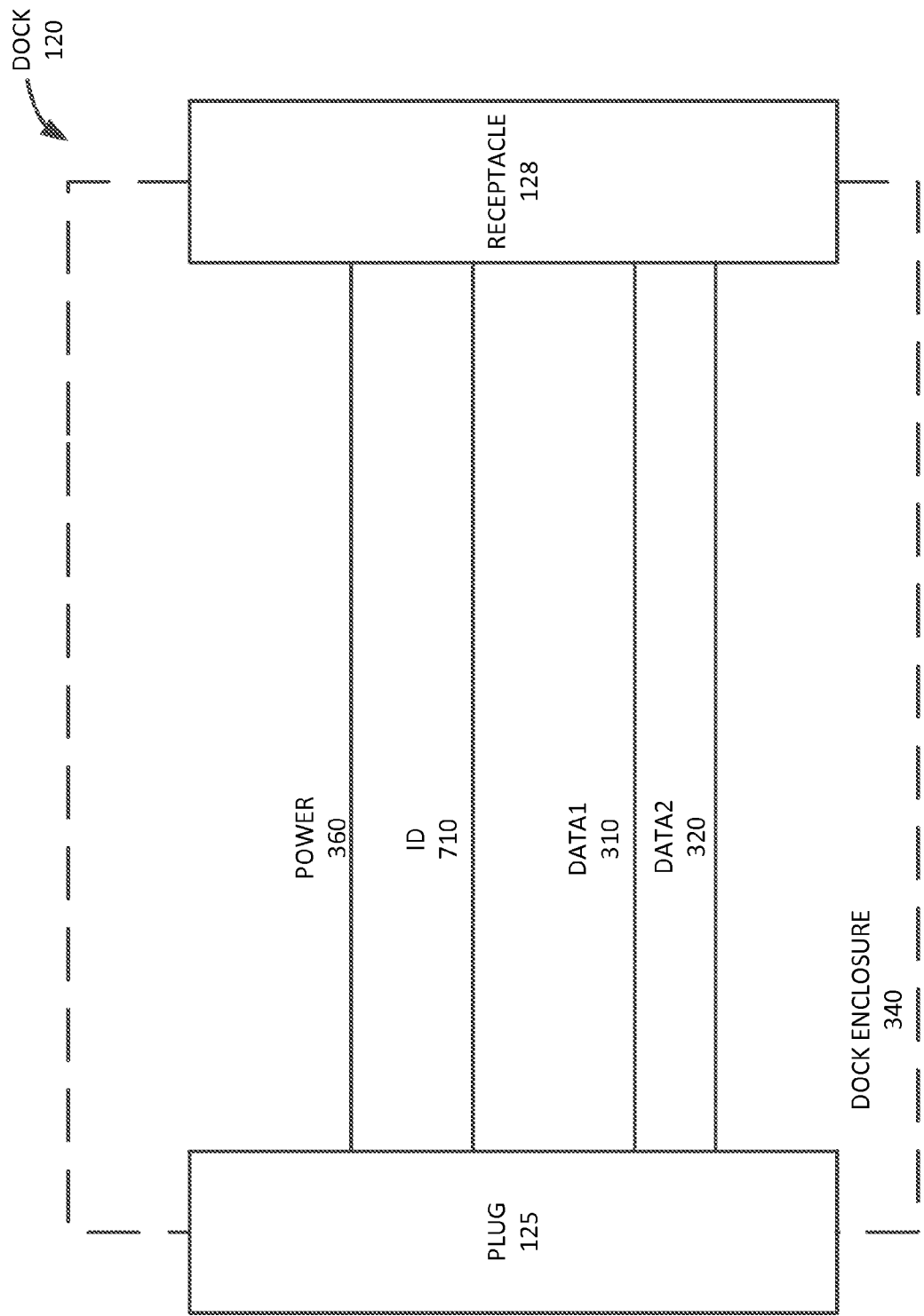
FIG. 3 illustrates a docking station according to an embodiment of the present invention.

FIG. 3 illustrates a docking station according to an embodiment of the present invention. Docking station 120 may be housed in docking enclosure 340. Docking enclosure 340 may include connector insert or plug 125 and receptacle 128. Two communication paths, DATA1 310 and DATA2 320 may connect to contacts in plug 125 and contacts in receptacle 128. Data paths DATA1 310 and DATA2 320 may be single-ended or differential signal paths.

Other data, control, and power lines may be connected between plug 125 and receptacle 128. One such control line may be an ID line 710. ID line 710 may be used by an accessory connected to receptacle 128 to provide authentication and identification information to a portable computing device connected to plug 125. Power on line 360 and well as ground or other power or bias lines (not shown) may be provided between plug 125 and 128.

In various embodiments of the present invention, receptacle 128 may accept different types of connector inserts. Some of these inserts may be unidirectional, that is, a connector insert may be inserted into receptacle 128 in only one orientation. Examples of this type of connector are USB, HDMI, DVI, and Thunderbolt connectors. Each of the various docking stations shown in these examples may utilize this type of connector to communicate with an accessory.

Other inserts may be bidirectional. That is, a connector insert may be inserted into receptacle 128 in at least two orientations. An example of this type of connector is the Lightening connector. A Lightening connector may include eight contacts, where an order of signals, power, and communications signals may be one way if a connector insert is inserted into receptacle 128 with a first polarity, and the order may be reversed if the connector inserted is inserted into receptacle 128 with a second or reversed polarity. Accordingly, circuitry associated with receptacle 128 may be used to detect a connector insert orientation and reverse the signal order if a connector insert is inserted into receptacle 128 with the second or reversed polarity. Details of how this reversal may be accomplished may be found in co-pending U.S. patent application Ser. No. 13/607,550, filed Dec. 7, 2012, titled TECHNIQUES FOR CONFIGURING CONTACTS OF A CONNECTOR, which is incorporated by reference. Some of the various docking stations herein or otherwise consistent with embodiments of the present invention may operate with this type of connector correctly if the portable computing device includes circuitry to adjust the order of the received signals, control lines, and power supplies. Other examples include docking stations that include circuits such that the docking station may operate with this type of connector, regardless of the capability of the portable computing device.

It should also be noted that some embodiments of the present invention may utilize a modified Lightening connector where the Lightening connector is unidirectional and can only be inserted into receptacle 128 in one orientation. To avoid confusion, this orientation may be indicated on the connector insert, for example with a symbol. This modified connector may operate with each of the docking stations in these examples. The docking station in this specific example may operate with a unidirectional connector and a Lightening or other bidirectional connector as receptacle 128 if the portable computing device includes circuitry to adjust the order of the received signals, control lines, and power supplies.

Other embodiments of the present invention may provide an audio output. Specifically, embodiments the present invention may provide docking stations having an audio jack that may receive an audio plug from headphones or other devices. An example is shown in the following figure.

Figure 4:
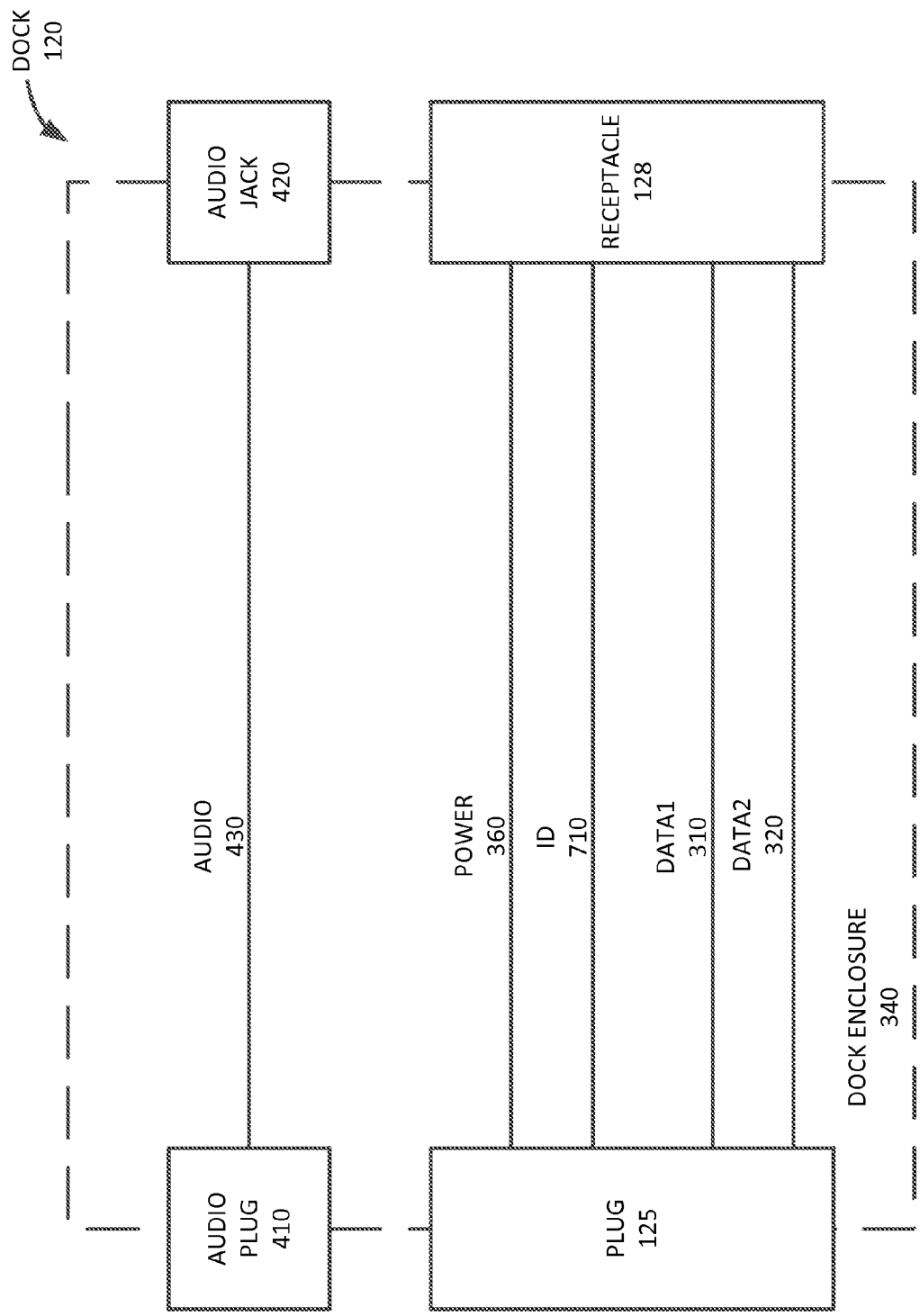
FIG. 4 illustrates a docking station that includes an audio jack according to an embodiment of the present invention.

FIG. 4 illustrates a docking station that includes an audio jack according to an embodiment of the present invention. Docking station 120 may include audio plug 410 and audio jack 420. Audio jack 420 may be used as receptacle 129 in FIG. 1. Audio plug 410 may be located near plug 125 such that audio plug 410 and connector insert or plug 125 may be inserted in a smart phone or other portable computing device 110 at the same time. Contacts on audio plug 410 may connect to contacts in audio jack 420 over audio signal path 430. Audio jack 420 may receive an audio plug connected to headphones or other device. The docking station in this specific example may operate with a unidirectional connector and a Lightening or other bidirectional connector as receptacle 128 if the portable computing device includes circuitry to adjust the order of the received signals, control lines, and power supplies.

In other embodiments of the present invention, it may be necessary for a docking station to identify and authenticate itself to a host devices such as smart phone or other portable computing device before the host device will communicate with the docking station. Accordingly, embodiments of the present invention may provide docking stations having authentication and identification capabilities. Examples are shown in the following figures.

Figure 5:
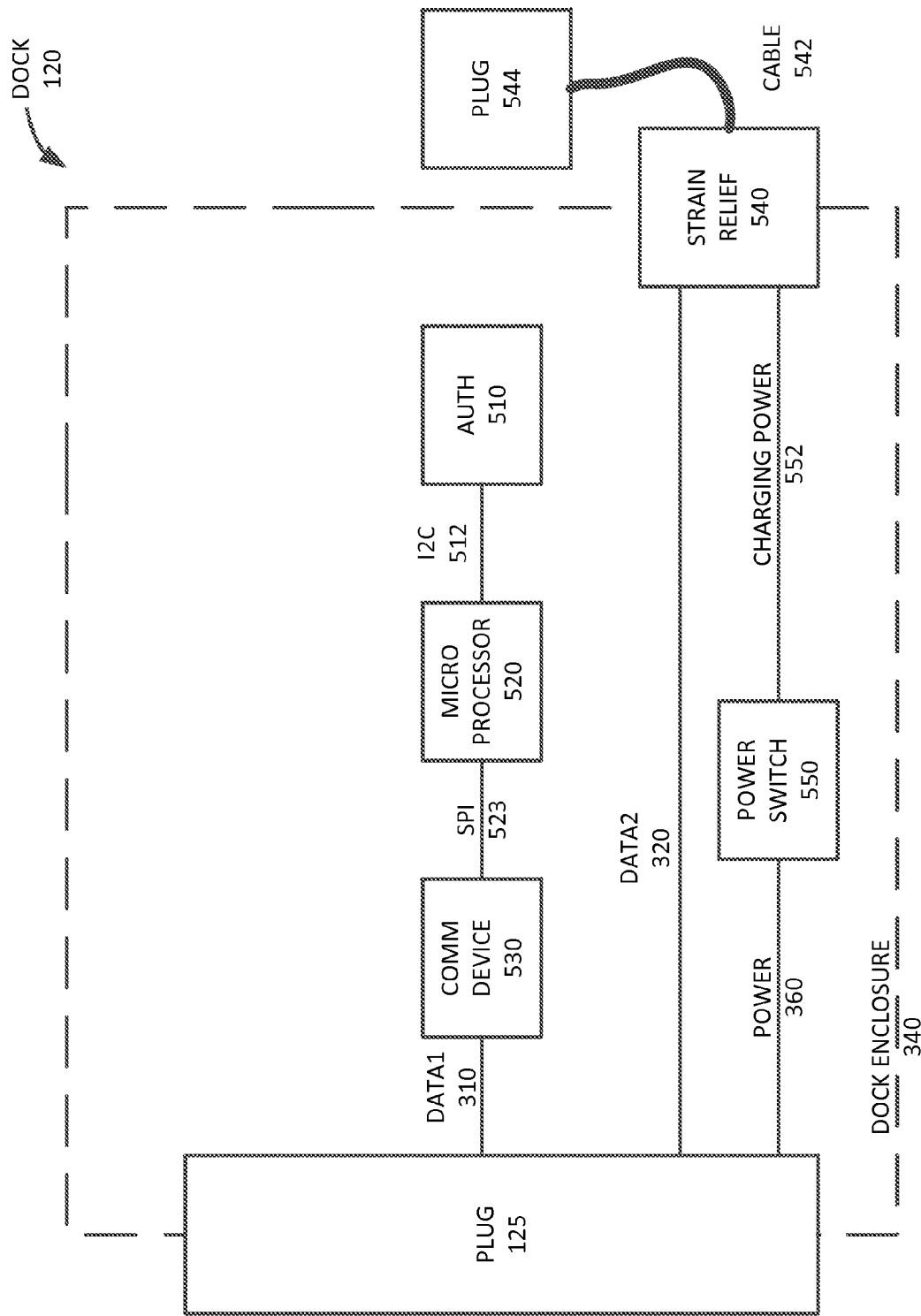
FIG. 5 illustrates a docking station that includes authentication circuitry according to an embodiment of the present invention.

FIG. 5 illustrates a docking station that includes authentication circuitry according to an embodiment of the present invention. Again, docking enclosure 340 may support a connector insert or plug 125. Plug 125 may include contacts for two data communication channels, DATA1 310 and DATA2 320. The first data communication path, DATA1 310, may be used to provide authentication and possibly identification information to smart phone or other portable computing device 110.

Specifically, authentication circuit 510 may include data and algorithms needed for a public-key cryptography or other authentication technique. Authentication circuit 510 may further include docking station identification information. Examples of authentication and identification techniques that may be employed by various embodiments of the present invention can be found in U.S. Pat. No. 8,117,651, issued Feb. 14, 2010, titled METHOD AND SYSTEM FOR AUTHENTICATING AN ACCESSORY, and co-pending U.S. patent application Ser. No. 13/710,084, filed Dec. 10, 2012, tiled MESSAGE-BASED IDENTIFICATION OF AN ELECTRONIC DEVICE, which are incorporate by reference.

Microprocessor 520 may communicate with authentication circuit 510 over an Inter-Integrated Circuit (I2C) or other type of communications bus. Microprocessor 520 may in turn communicate with smart phone or other portable computing device 110 through communication device 530. Microprocessor 520 may communicate with communication device 530 over bus such as Serial Peripheral Interface (SPI) bus 523. The second data communications channel, DATA2 320, may be provided through cable 542 to plug 544. Plug 544 may be inserted in an accessory device (not shown.) Cable 542 may pass through strain relief 540 on a side of device enclosure 340.

In various embodiments of the present invention, docking station 120 may identify itself to a smart phone or other portable computing device 110 so that the portable computing device 110 knows how to format data that is provided over the one or more data paths, such as DATA1 310 and DATA2 320. For example, plug 544 may be a USB plug, and authentication circuit 510 may instruct portable computing device 110 to provide data on data path DATA2 320 in a USB format.

In various embodiments of the present invention, authentication circuit 510, or other appropriate circuit, may read identification and authorization information from an attached accessory (not shown.) The authentication circuit 510 or other circuit may then instruct the portable computing device how to provide data on the data paths for use by the accessory.

Audio plug 410, audio jack 420, and audio signal path 430 as shown above may be included in this embodiment to provide an audio output. The docking station in this specific example may include a unidirectional connector as plug 544. It may not work correctly with a Lightening or other bidirectional connector as plug 544.

In the above examples, power 360 and other bias lines may be coupled between plug 125 and receptacle 128, or in this example, between plug 125 and cable 542. But this may cause voltages to be present on exposed contacts on plug 125 when a portable computing device is not attached to docking station 120. Accordingly, embodiments of the present invention may provide one or more switches, relays, variable resistances, or other mechanism to avoid exposing such voltages where they may be inadvertently contacted by a user or the user's property.

In this example, power switch 550 may be included. Power switch 550 may receive power from an accessory on line 522, such as a charger, via plug 544 and cable 542 or receptacle 128. Power switch 550 may detect or be informed whether a portable computing device 110 is attached at plug 125. If no portable computing device 110 is attached at plug 125, power switch 550 may be in an open or high-impedance state, thereby protecting a user from inadvertent contact with a voltage on an exposed contact on plug 125. When a portable computing device 110 is attached at plug 125, power switch 550 may be in a closed or low-impedance state, and power may be provided by accessory 130 onto line 522, through power switch 550 and power line 360 to plug 125, where it may be received by portable computing device 110.

In a specific embodiment of the present invention, power switch 550 may include circuitry to sense an impedance at a pin at plug 125 in order to determine that portable computing device 110 is attached at plug 125, though this determination may be made by power switch 550 in other ways. In other embodiments of the present invention, other circuits may detect that computing device 110 is attached at plug 125 by looking for a connection to ground at one pin, or by using another method. This other circuit may then inform power switch 550 that computing device 110 is attached at plug 125. In still other embodiments of the present invention, power switch 550 itself may have this capability.

Figure 6:
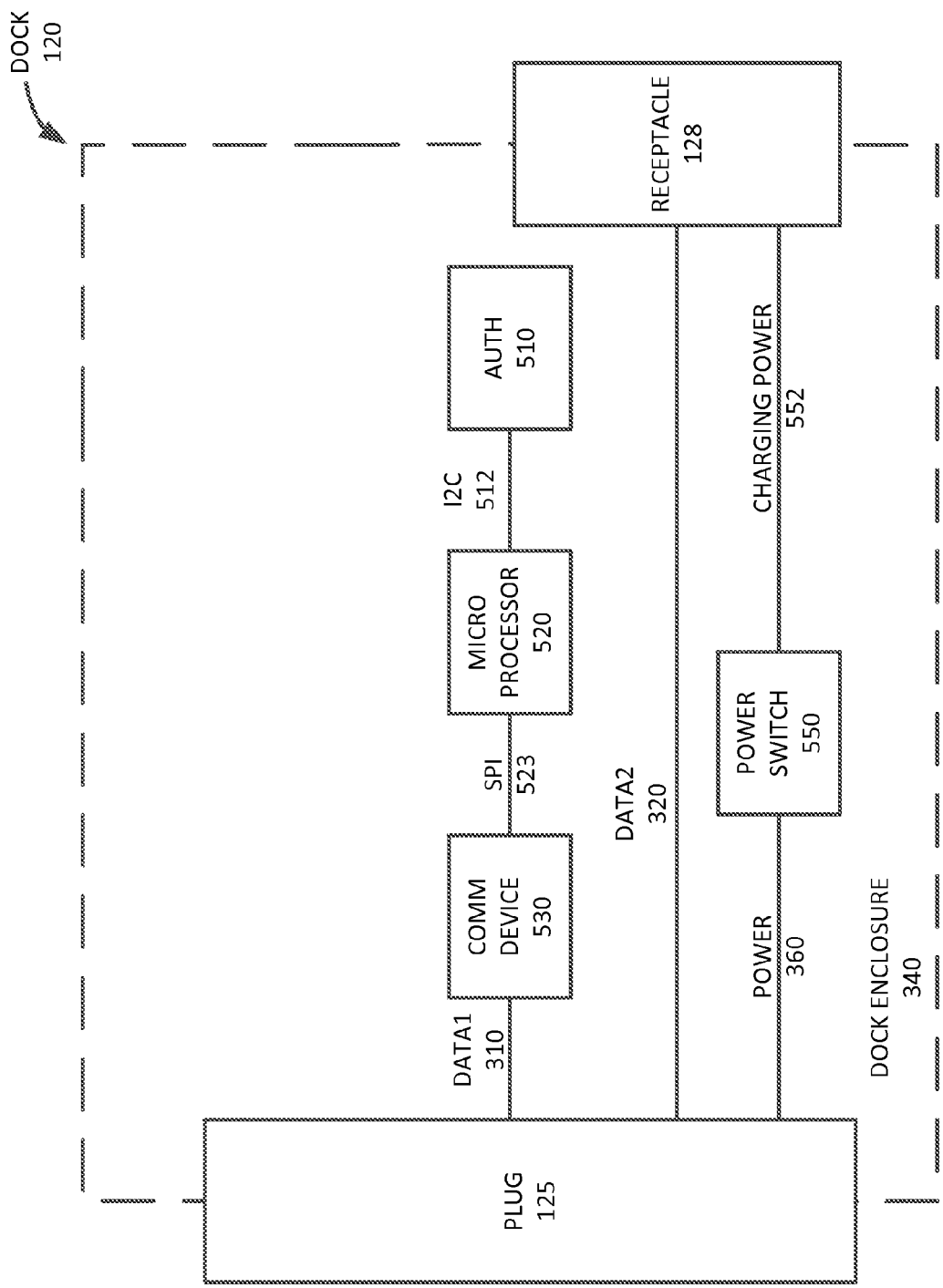
FIG. 6 illustrates another docking station that includes authentication circuitry according to an embodiment of the present invention.

FIG. 6 illustrates another docking station that includes authentication circuitry according to an embodiment of the present invention. In this example, strain relief 540, cable 542, and plug 544 may be replaced by receptacle 128. As before, audio plug 410, audio jack 420, and audio signal path 430 may be included in this embodiment to provide an audio output. The docking station in this specific example may operate with a unidirectional connector. It may not work correctly with a Lightening or other bidirectional connector as receptacle 128.

In these embodiments of the present invention, one data path may be consumed with providing and receiving authentication and identification information. Accordingly, embodiments of the present invention may communicate authentication and identification information to a smart phone or other portable computing device using a separate control line or pin. That is, a separate control or identification pin may be used in order to free up to an additional data communication path. Examples are shown in the following figures.

Figure 7:
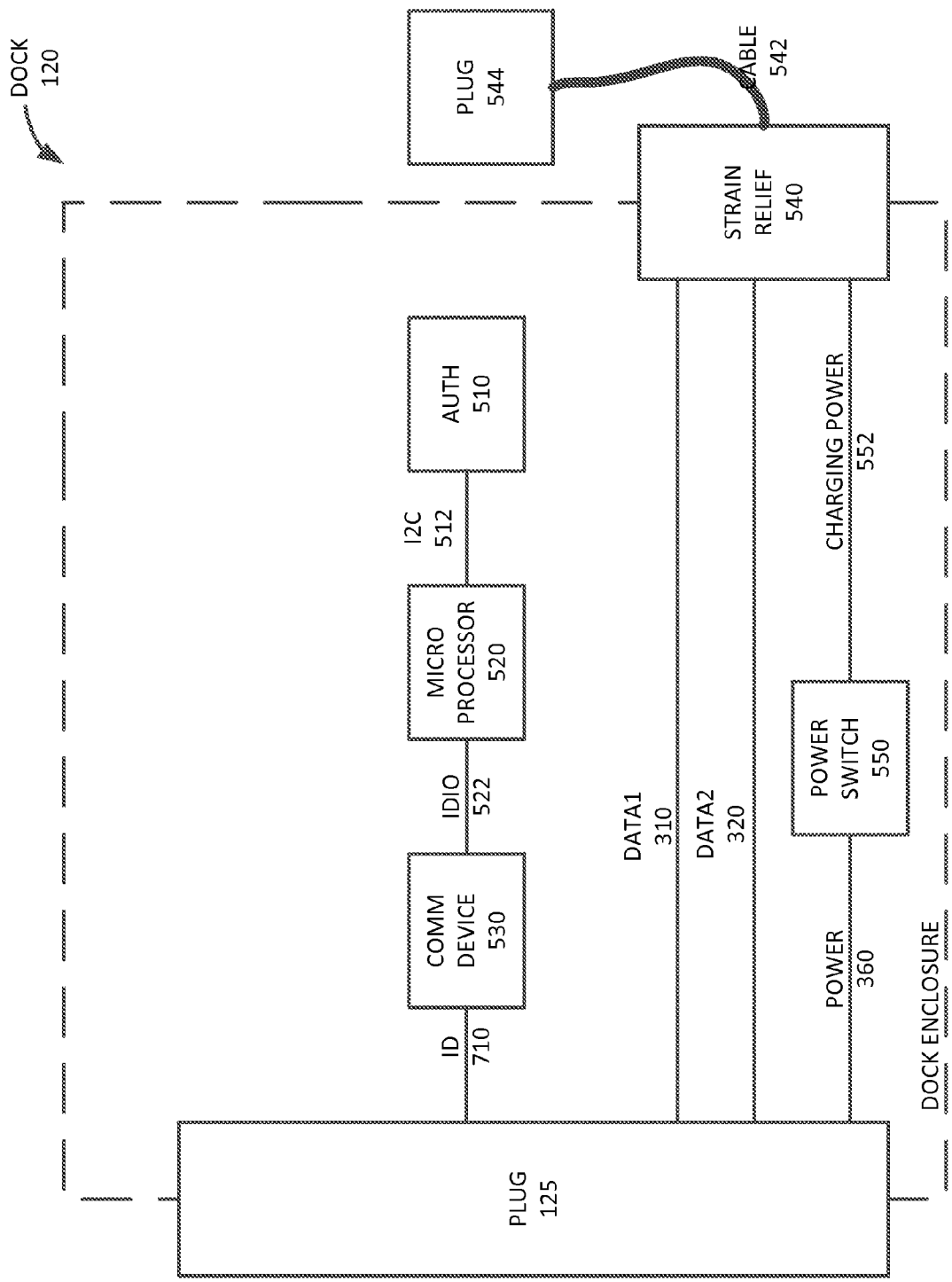
FIG. 7 illustrates a docking station according to an embodiment of the present invention.

FIG. 7 illustrates a docking station according to an embodiment of the present invention. As before, docking station 120 may include connector insert or plug 125 for mating with a corresponding receptacle on a portable computing device. In this example, communication device 530 communicates with portable computing device 110 over ID pin 710. This frees up one data channel such that two data channels or paths, DATA1 310 and DATA2 320, may be provided to an accessory via cable 542 and plug 544. In other embodiments of the present invention, each data channel may be made available to a separate accessory through a separate cable and plug or receptacle. The docking station in this specific example may include a unidirectional connector as plug 544. It may not work correctly with a Lightening or other bidirectional connector as plug 544.

Figure 8:
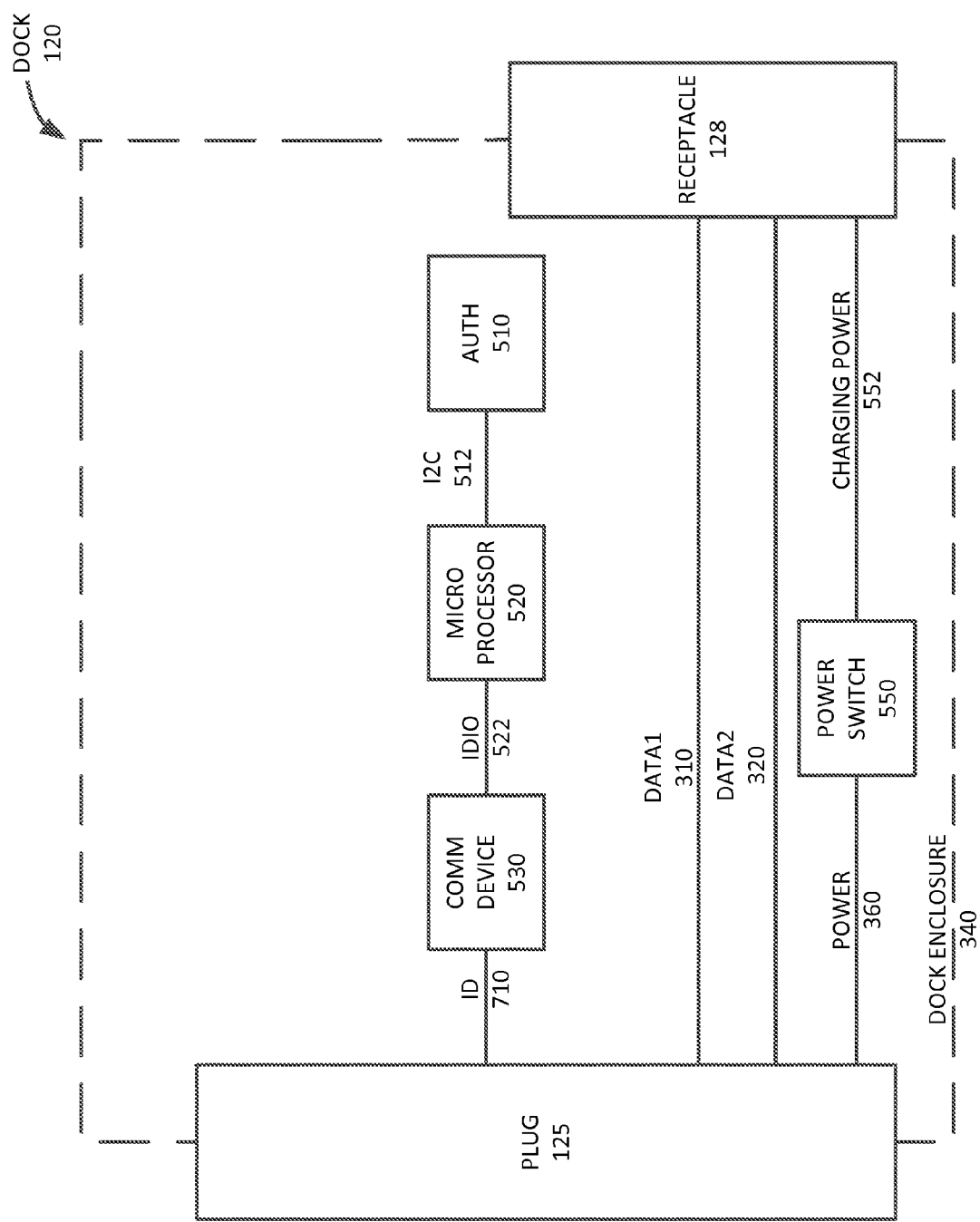
FIG. 8 illustrates a docking station according to an embodiment of the present invention.

FIG. 8 illustrates a docking station according to an embodiment of the present invention. In this example, the two data channels, DATA1 310 and DATA2 320, may be made available to an accessory at receptacle 128. The docking station in this specific example may operate with a unidirectional connector. It may not work correctly with a Lightening or other bidirectional connector as receptacle 128.

Again, in these two above examples, audio plug 410, audio jack 420, and a signal path 430 may be included to provide an audio output. But it may be somewhat awkward to provide audio plug 410 on docking station 120. For example, it may be difficult for a user to align a portable computing device correctly in order to insert both plug 125 and audio plug 410 at the same time. This awkwardness may cause customer confusion and lead to damage of either the portable computing device or docking station. Also, the aesthetics of such a configuration may not be optimal. Accordingly, embodiments of the present invention may use a data communication path to convey an audio signal from plug 125 to audio jack 420. In this way, audio plug 410 is not needed. Examples are shown in the following figures.

Figure 9:
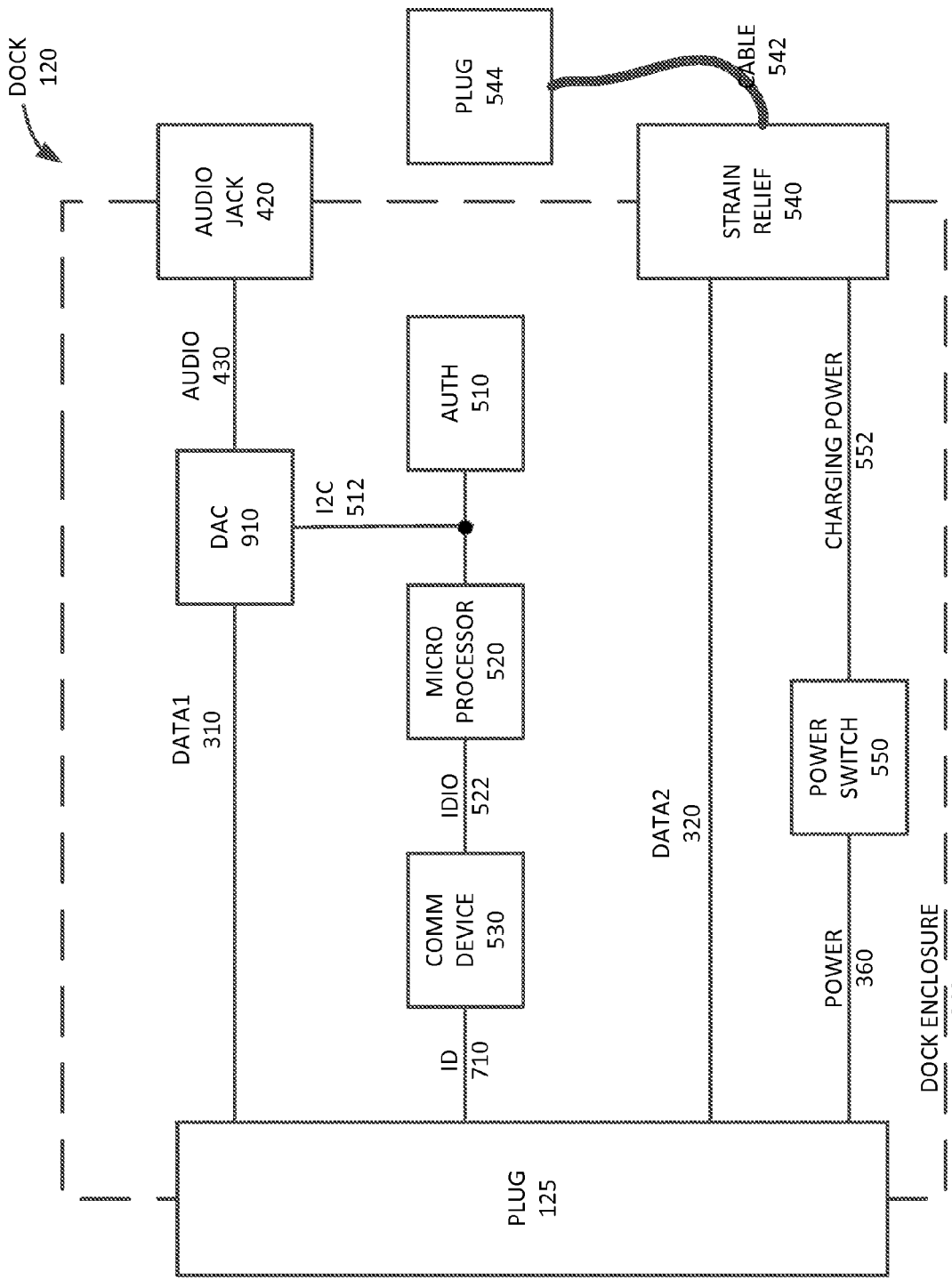
FIG. 9 illustrates another docking station that includes an audio jack according to an embodiment of the present invention.

FIG. 9 illustrates another docking station that includes an audio jack according to an embodiment of the present invention. In this example, one data path, specifically DATA1 310, is provided to a digital-to-analog converter 910. Digital-to-analog converter 910 may convert digital data on data path DATA1 310 into an analog audio signal. Digital-to-analog converter 910 may provide the audio signal on line 430 to audio jack 420. Audio jack 420 may receive an audio plug connected to headphones or other types of devices. As before, a second data path, DATA2 320 may be provided to an accessory through cable 542 and plug 544.

More specifically, digital-to-analog converter 910 may receive a digital signal from portable computing device 110 via data path DATA1 310. This data signals may include header and other packet information. Digital-to-analog converter 910 may remove this information in order to access the audio data. Digital-to-analog converter 910 may convert the digital audio information to an analog audio signal on line 430 to provide this signal to audio jack 420. The operation of digital-to-analog converter 910 may be controlled by microprocessor 520 over Inter-Integrated Circuit (I2C) bus 512. The docking station in this specific example may include a unidirectional connector as plug 544. It may not work correctly with a Lightening or other bidirectional connector as plug 544.

Figure 10:
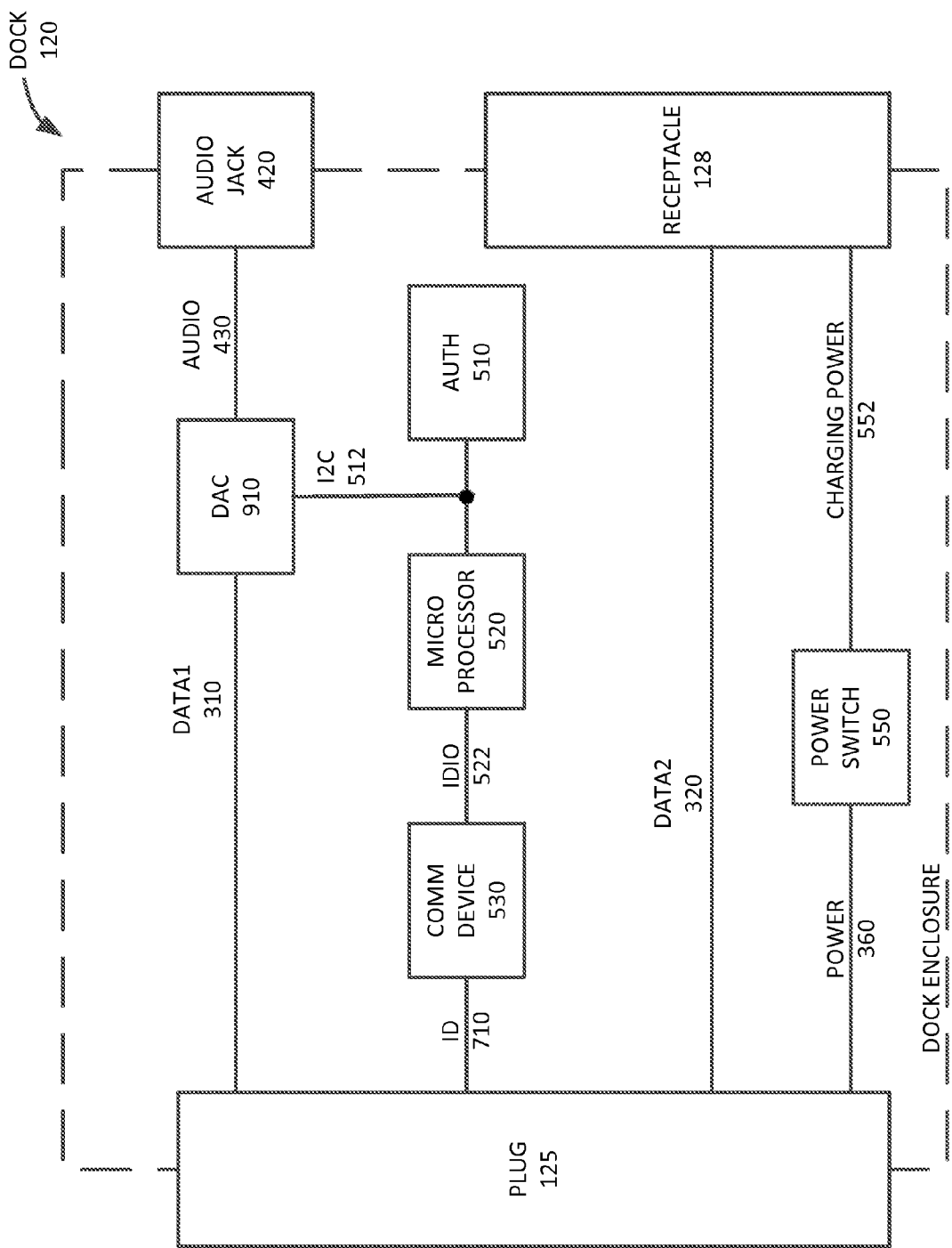
FIG. 10 illustrates another docking station that includes an audio jack according to an embodiment of the present invention.

FIG. 10 illustrates another docking station that includes an audio jack according to an embodiment of the present invention. In this example, a second data path DATA2 320 is provided to an accessory via receptacle 128. The docking station in this specific example may operate with a unidirectional connector. It may not work correctly with a Lightening or other bidirectional connector as receptacle 128.

In these configurations, an audio signal is made available at an audio jack 420 without the necessity of an audio plug being included on the docking station. As can be seen however, these configurations consume a data path in order to provide an audio output signal. Accordingly, embodiments of the present invention may provide docking stations were this data path may be used to provide audio data via audio jack 420 as well as to provide data to an accessory via cable 542 and plug 544 or receptacle 128. Examples are shown in the following figures.

Figure 11:
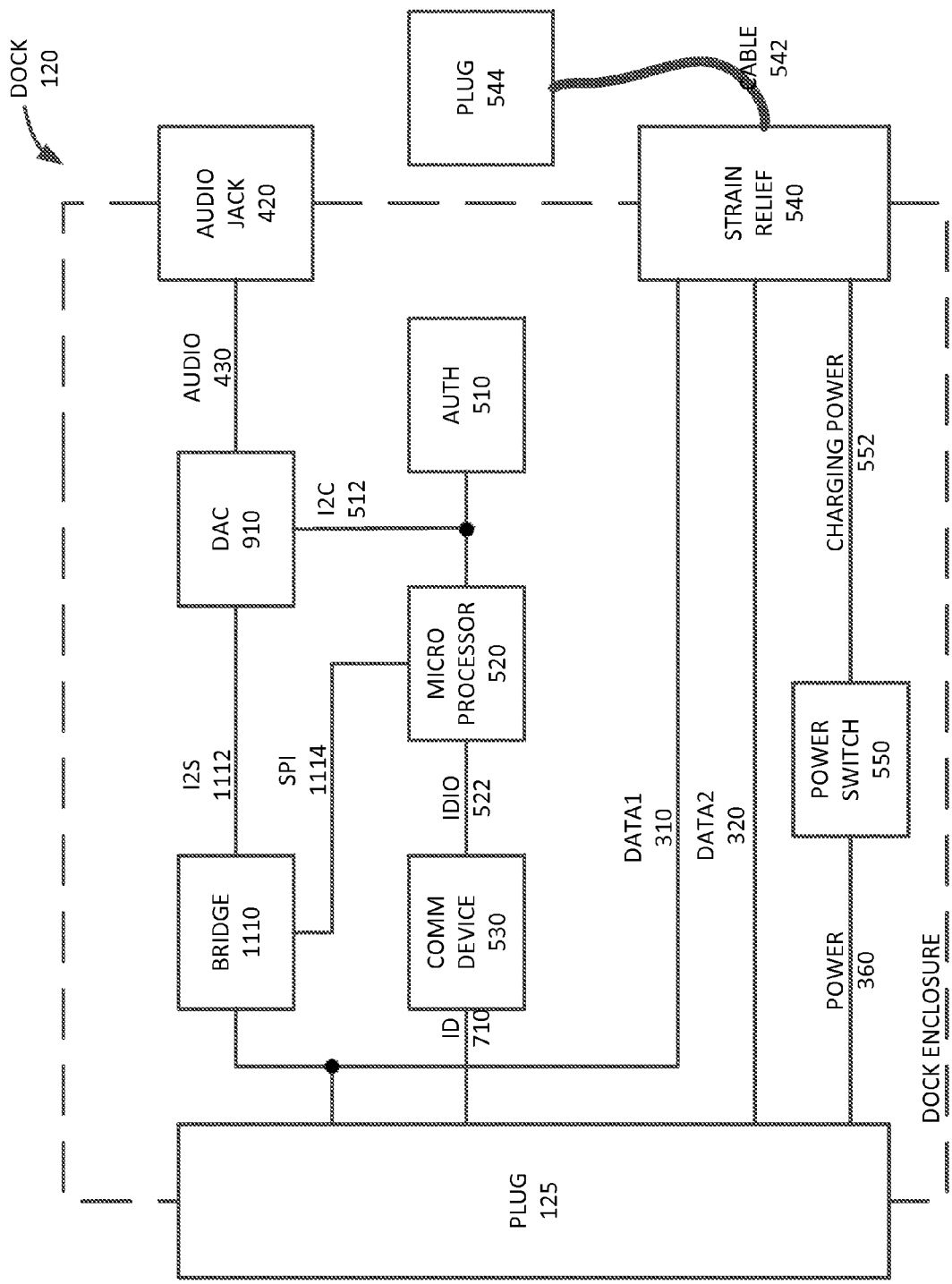
FIG. 11 illustrates a docking station according to an embodiment of the present invention.

FIG. 11 illustrates a docking station according to an embodiment of the present invention. In this example, a data path, DATA1 310, is provided to both bridge 1110 and cable 542. Bridge 1110 may inspect incoming data packets from either or both portable computing device 110 and an accessory attached to cable 542 via plug 544. Bridge 1110 may recognize audio data packets and remove header and other non-audio information from these packets. Bridge 1110 may then provide audio information to digital-to-analog converter 910 over Integrated Interchip Sound (I2S) bus 1112. Bridge 1110 may communicate with and receive instructions from microprocessor 520 using Serial Peripheral Interface (SPI) bus 1114. Digital-to-analog converter 910 may then convert the digital audio information to an analog signal and provide the analog signal on analog signal path 430 to audio jack 420. Data path DATA1 310 may also be provided to an accessory via cable 542 and plug 544. Again, in this configuration, two data paths, DATA1 310 and DATA2 320, are provided to an accessory, and audio information may be provided at audio jack 420 without the inclusion of an audio plug on a docking station 120. The docking station in this specific example may include a unidirectional connector as plug 544. It may not work correctly with a Lightening or other bidirectional connector as plug 544.

It should be noted that in these examples, audio information is provided at audio jack 420 as an analog signal. In this and other embodiments of the present invention, including the other examples shown here, audio information may be provided as a digital signal to audio jack 420. In these embodiments, audio jack 420 may include an LED or laser to convert the digital audio information into light pulses.

Figure 12:
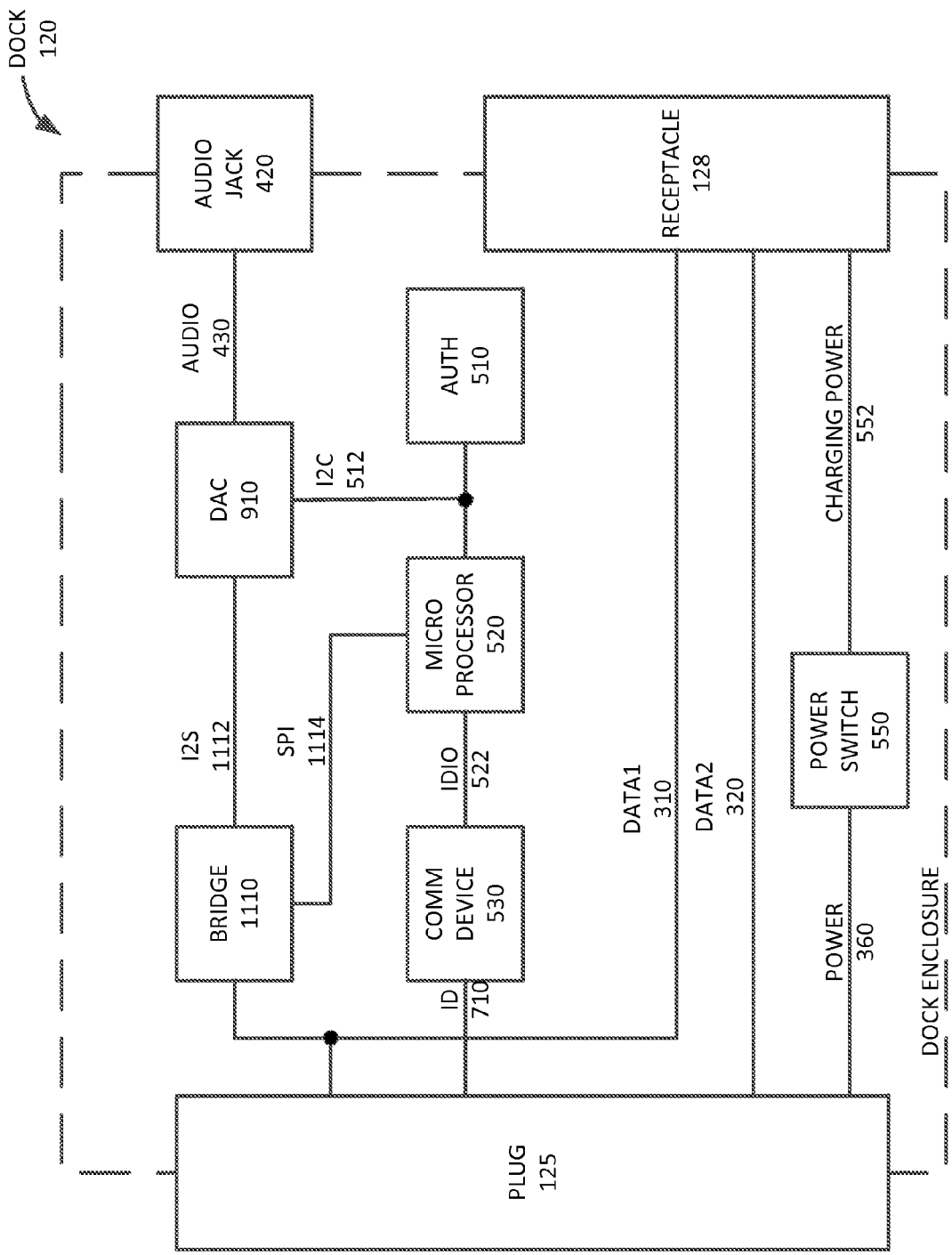
FIG. 12 illustrates another docking station according to an embodiment of the present invention.

FIG. 12 illustrates another docking station according to an embodiment of the present invention. In this embodiment, cable 542 and plug 544 may be replaced by receptacle 128. The docking station in this specific example may operate with a unidirectional connector. It may not work correctly with a Lightening or other bidirectional connector as receptacle 128.

Again, embodiments of the present invention may communicate with one or more accessories. One specific embodiment of the present invention may communicate with two accessories. An example is shown in the following figure.

Figure 13:
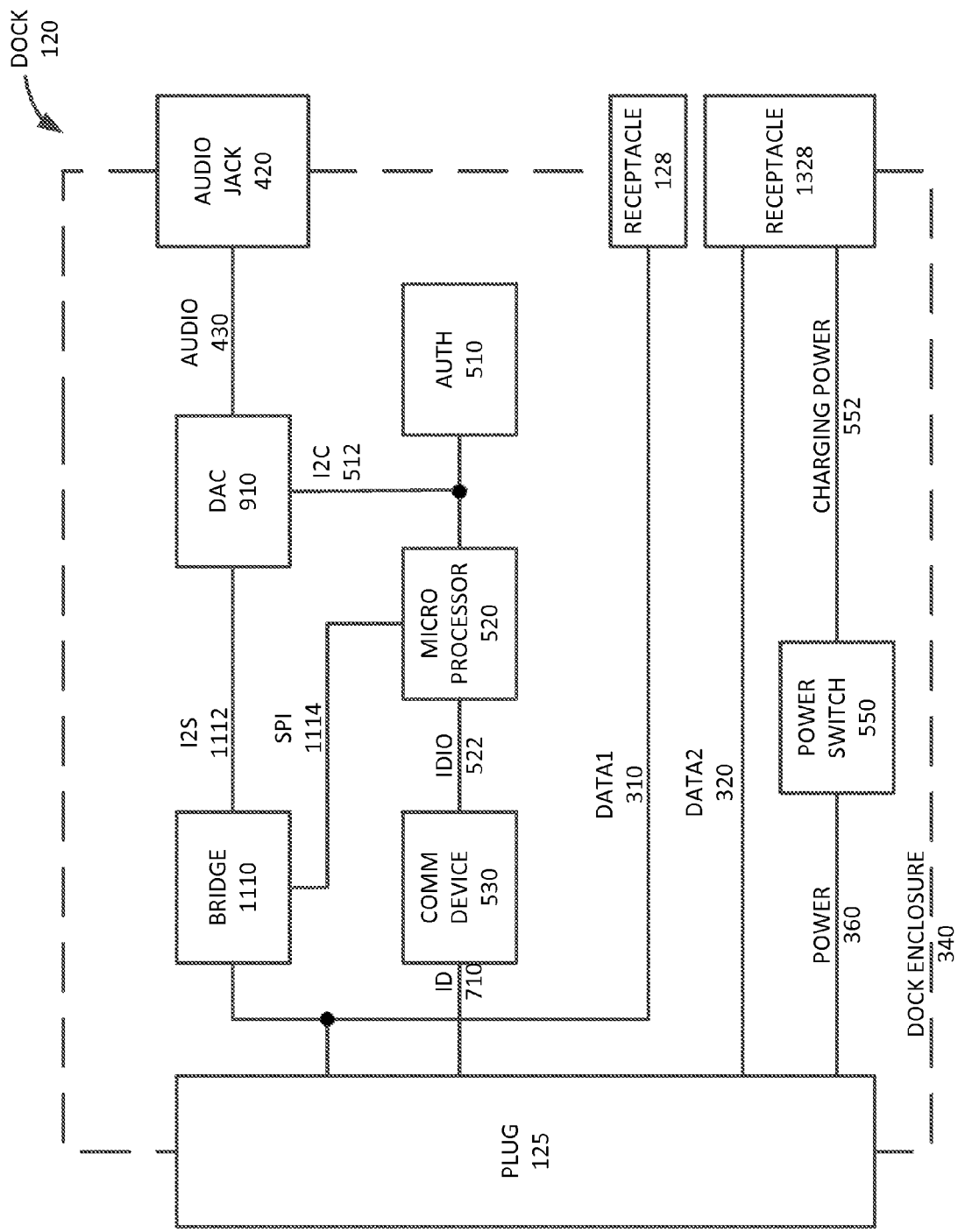
FIG. 13 illustrates a docking station that includes two receptacles according to an embodiment of the present invention.

FIG. 13 illustrates a docking station that includes two receptacles according to an embodiment of the present invention. Specifically, docking station 120 includes receptacle 128 and receptacle 1328. In this example, a first data path, DATA1 310, may be coupled to receptacle 128, while a second data path, DATA2 320, may be coupled to receptacle 1328. The docking station in this specific example may operate with unidirectional connectors. It may not work correctly with Lightening or other bidirectional connectors as receptacles 128 and 1328.

Embodiments of the present invention may communicate with these one or more accessories using different types of connector interfaces. One such interface is the Lightning connector interface. Lightning connectors are reversible. That is, a Lightning connector insert may be inserted into a Lightening receptacle in one of two orientations. Accordingly, embodiments of the present invention may include a number of multiplexers to multiplex signals received from an accessory. An example of a Lightning connector insert is shown in the following figure.

Figure 14:
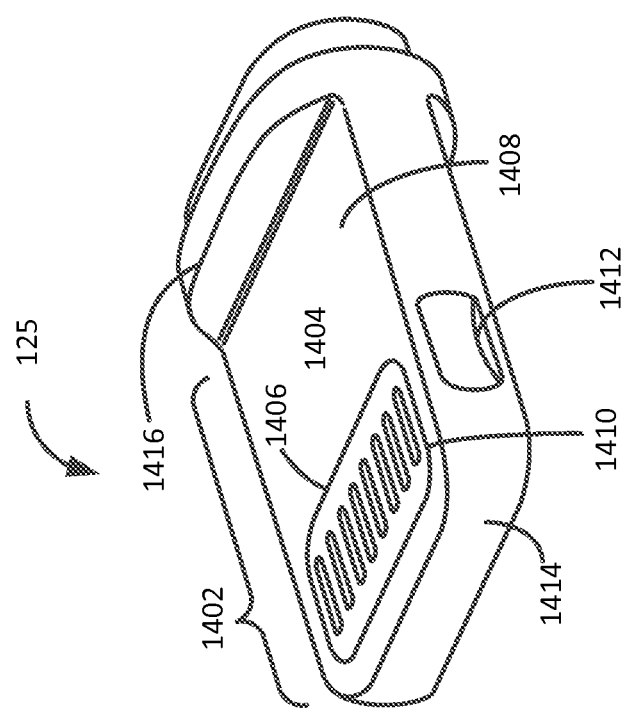
FIG. 14 illustrates a Lightning connector insert that may be employed and received by embodiments the present invention.

FIG. 14 illustrates a Lightning connector insert that may be employed and received by embodiments the present invention. Specifically, this connector may be used as connector 125 on docking station 120. It may also be used as plug 544 attached to cable 542 in the tethered cable examples shown herein. This connector may also be received at receptacle 128 in some of the examples shown herein.

Connector insert 125 may include insert portion or tab 1402. Tab 104 may be sized to be inserted into a corresponding receptacle connector during a mating event and may include a first contact region 1406 formed on a first major surface 1404 and a second contact region (not shown) formed at a second major surface (also not shown) opposite surface 1404. Surface 1404 may extend from a distal tip 1414 of tab 1402 to spine 1416 that, when tab 1402 is inserted into a corresponding receptacle connector, abuts a housing of the receptacle connector or portable computing device that the receptacle connector is incorporated in. Tab 1402 may also include first and second opposing side surfaces that extend between the first and second major surfaces including 1404.

A plurality of contacts 1410 can be formed in each of contact regions 1406 on each side of tab 1402 such that, when tab 1402 is inserted into a corresponding receptacle connector, contacts 1406 are electrically coupled to corresponding contacts in the receptacle connector. In some embodiments, contacts 1406 are self-cleaning wiping contacts that, after initially coming into contact with a receptacle connector contact during a mating event, slide further past the receptacle connector contact with a wiping motion before reaching a final, desired contact position.

The structure and shape of tab 1402 may be defined by a ground ring 1408 that can be made from stainless steel or another hard conductive material. Connector 125 may include retention feature 1412 and a corresponding feature on the opposite side of tab 1402 formed as curved pockets in the sides of ground ring 1408 that may double as ground contacts.

Various embodiments of the present invention may utilize this or other types of connectors as plug 125 on docking station 120, as plug 544 to connect to an accessory, or to be accepted at receptacle 128 by docking station 120. The numbers pins or contacts and pins assignments may vary as well. Specific pinouts that may be used for these plugs and receptacles can be found in co-pending U.S. patent application Ser. No. 13/607,366, filed Sep. 7, 2012, titled DUAL ORIENTATION ELECTRONIC CONNECTOR, which is incorporated by reference.

Again, this connector may be used as connector 125 on docking station 120. It may also be used as plug 544 attached to cable 542 in the tethered cable examples shown herein. This connector may also be received at receptacle 128 in the following figures. (It may also be received in the examples above, but care should be taken to ensure that only an insertion that does not require an inversion or reversal is made. This may be accomplished, for example, by using a cable having a marking to indicate a desirable orientation.)

Figure 15:
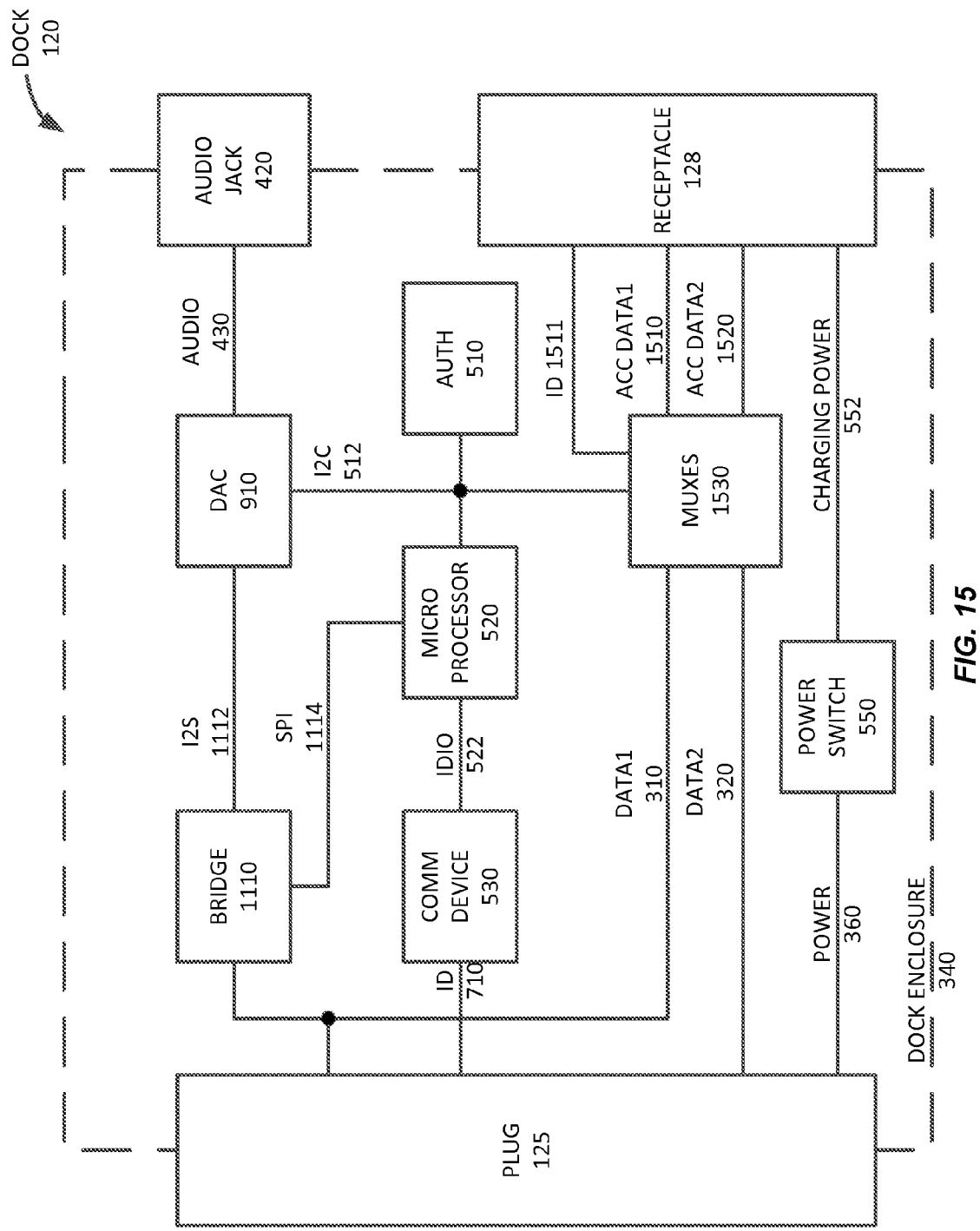
FIG. 15 illustrates a docking station that may accept a bidirectional plug according to an embodiment of the present invention.

FIG. 15 illustrates a docking station that may accept a bidirectional plug according to an embodiment of the present invention. Again, receptacle 128 may receive a connector insert such as a Lightening connector insert. Specifically, receptacle 128 may receive a connector insert in either of two directions. Multiplexers 1530 may receive signals on one or more control lines, such as ID 1511, from an accessory 130 and use these one or more control signals to determine the orientation of a connector in receptacle 128. Multiplexers 1530 may multiplex data lines ACC DATA1 1510 and ACC DATA2 1520 received from the receptacle in such a way that a consistent connection is made to data paths DATA1 310 and DATA2 320 regardless of the orientation of the connector insert. That is, in one orientation the multiplexers merely pass signals through directly, while in a second orientation, signals on each pin are swapped in a mirrored image manner. Details of this may be found in co-pending U.S. patent application Ser. No. 13/607,550, filed Dec. 7, 2012, titled TECHNIQUES FOR CONFIGURING CONTACTS OF A CONNECTOR, which is incorporated by reference. Since this example docking station includes multiplexing circuits 1530, it may operate with either unidirectional or bidirectional connectors being inserted into connector receptacle 128.

Figure 16:
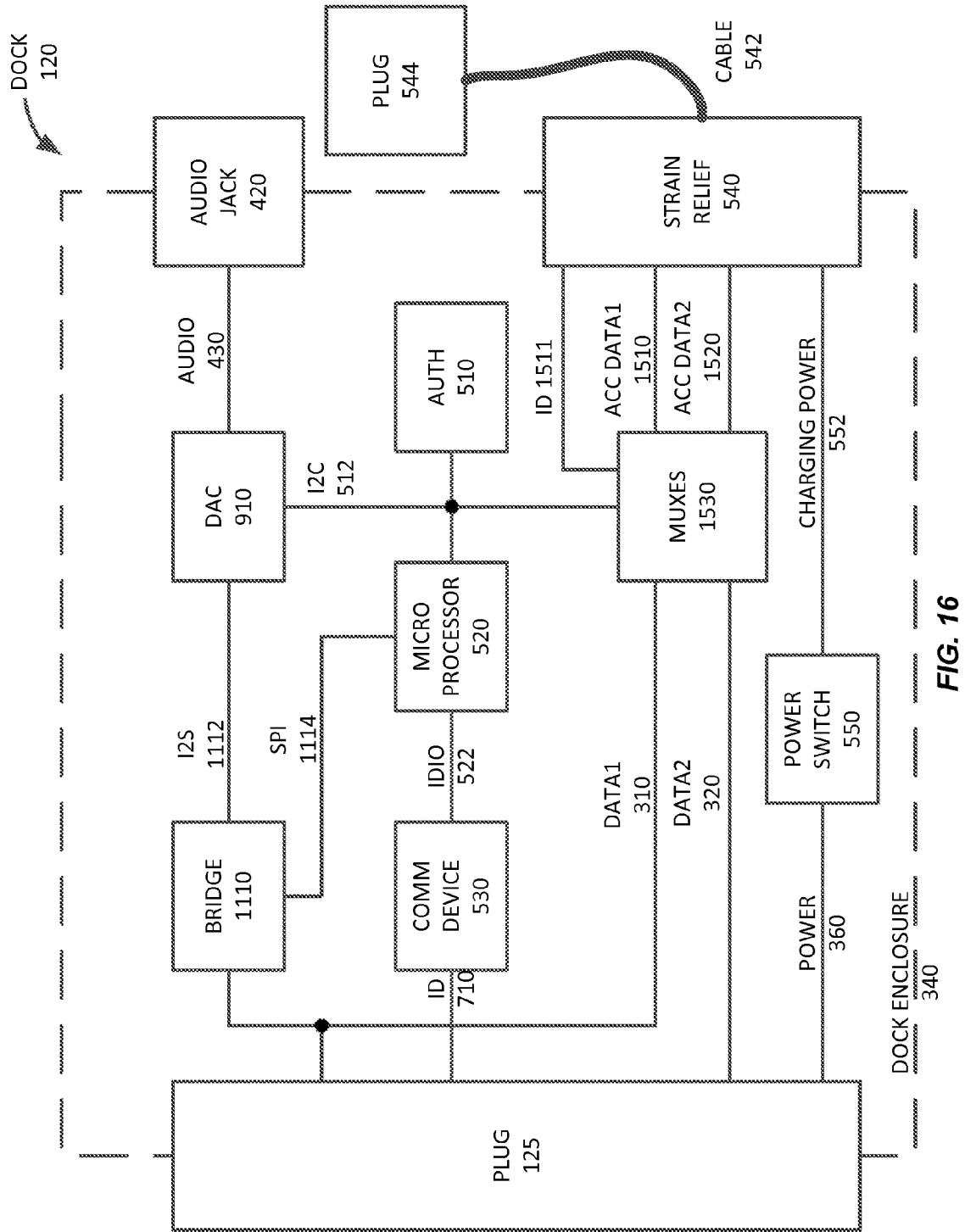
FIG. 16 illustrates a docking station that may provide a bidirectional connection according to an embodiment of the present invention.

FIG. 16 illustrates a docking station that may provide a bidirectional connection according to an embodiment of the present invention. As with other examples, receptacle 128 is replaced with a cable 542 and plug 544, where the plug 544 is a reversible plug such as a Lightening connector insert or plug. Inclusion of multiplexing circuits 1530 allows plug 544 to be inserted in either of two orientations, each 180 apart, in a receptacle on an accessory. Again, since this example docking station includes multiplexing circuits 1530, it may operate with either unidirectional or bidirectional connectors being inserted into connector receptacle 128.

Embodiments of the present invention may provide docking stations having additional features. These features may be provided using one or more docking station interfaces. An example is shown in the following figure.

Figure 17:
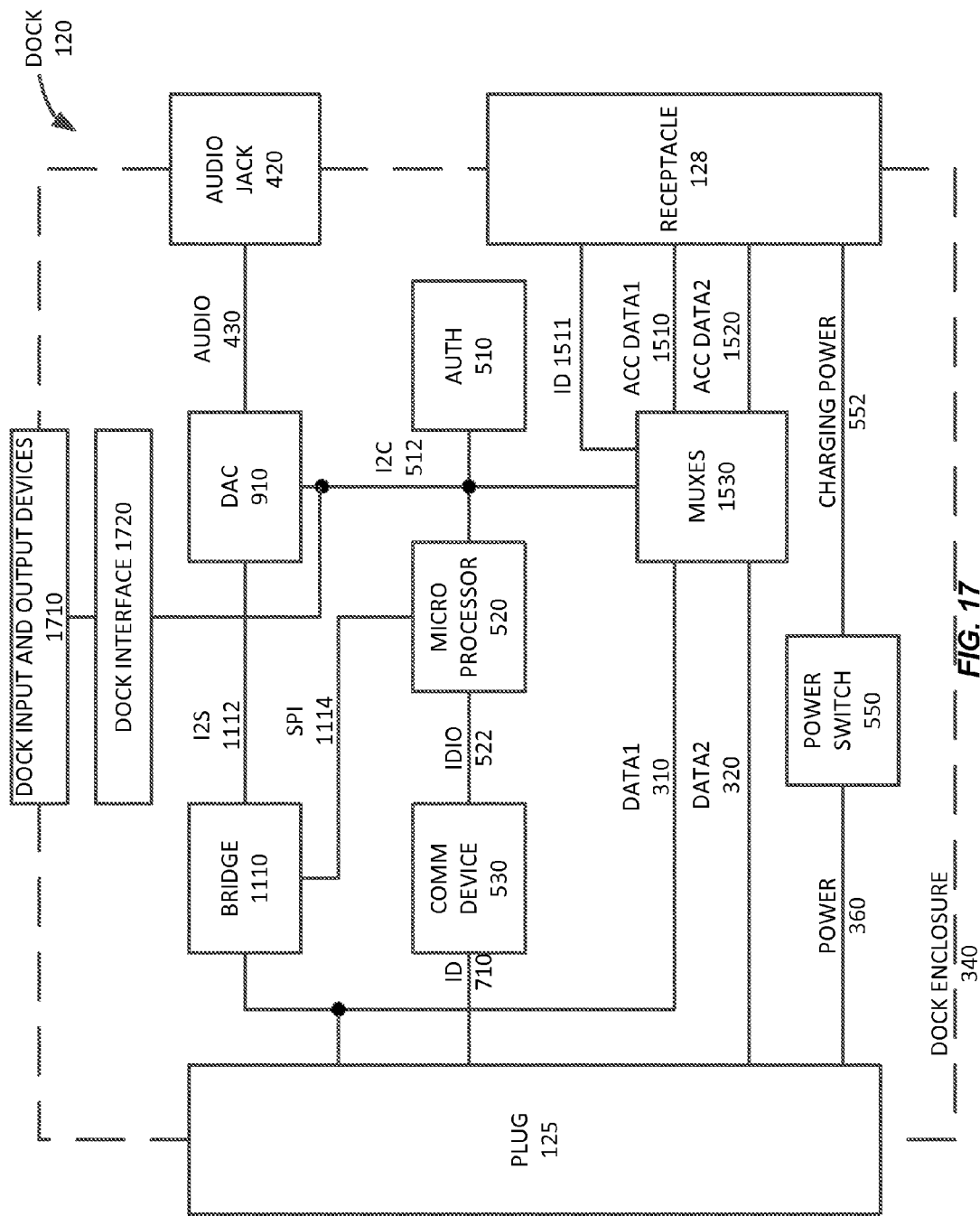
FIG. 17 illustrates a docking station having additional features according to an embodiment of the present invention.

FIG. 17 illustrates a docking station having additional features according to an embodiment of the present invention. In this example, docking station input and output devices 1710 and docking station interface 1720 are included. Docking station interface 1720 may communicate with microprocessor 520 using I2C bus 512, though in other embodiments of the present invention, docking station interface 1720 or another docking station interface circuitry may communicate with microprocessor 520 using Serial Peripheral Interface (SPI) bus 1114.

Docking station input and output devices 1710 may include various components such as light-emitting diodes (LEDs), buttons, touch pads, displays, wireless communication devices, and other types of components.

For example, light-emitting diodes may be used to indicate the charging status of a battery in a portable computing device 110 attached to docking station 120. For example, a multi-colored LED may have a first color to indicate that a charge is occurring and a second color to indicate that the charging is complete. Light-emitting diodes may also be used in conjunction with proximity sensors. Specifically, an LED may light when motion near connector insert 125 is detected by a proximity detector. This may assist a user in attaching portable computing device 110 to docking station 120. Light-emitting diodes may also be used to indicate status settings, such as do-not-disturb, airplane mode, and alarm status modes.

Touch pads or buttons may be used to control playback volume through an audio channel. Touch pads or buttons may be used for snooze or mode select functions, such as to put a portable computing device into a do-not-disturb or airplane mode.

A display may be used to indicate time or mode of the device. Again, a display may be used to indicate an alarm or snooze setting, do-not-disturb or airplane settings, and other types of settings. The display may also provide weather, news, traffic, or other information.

Wireless communications devices may be used as remote controls for devices such as coffee makers, thermostats, lighting, and other types of devices. These wireless devices may connect to cellular or Wi-Fi networks to provide, retrieve, or synchronize data between or among portable computing device 110, accessories 130, and other devices.

Docking station input and output devices 1710 may also include gesture recognition devices. Gesture detection may allow a user to interact with a docking station by simply making hand movements in the proximity of the docking station. For example, gestures may be used to put an alarm in a snooze state, to turn on a display, to show time, date, weather, news, or other information or combination thereof.

Again, since this example docking station includes multiplexing circuits 1530, it may operate with either unidirectional or bidirectional connectors being inserted into connector receptacle 128.

Figure 18:
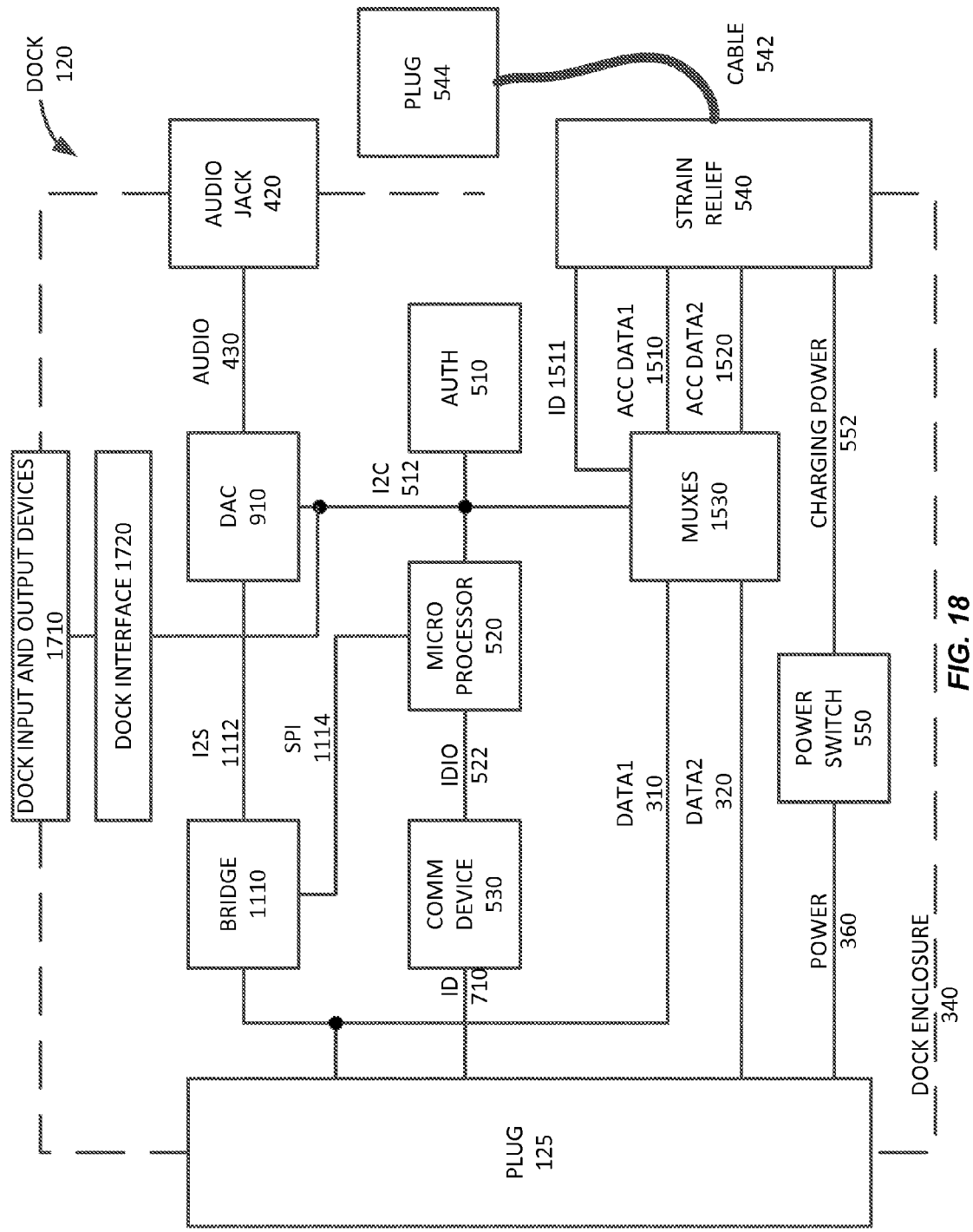
FIG. 18 illustrates a docking station having additional features according to an embodiment of the present invention.

FIG. 18 illustrates a docking station having additional features according to an embodiment of the present invention. As with other examples, receptacle 128 is replaced with a cable 542 and plug 544, where the plug 544 is a reversible plug such as a Lightening connector insert or plug. Since this example docking station includes multiplexing circuits 1530, it may operate with either unidirectional or bidirectional connectors as plug 544.

Various embodiments of the present invention may provide circuits for other wired or wireless connections to external accessories or other devices. One embodiment of the present invention may provide a docking station having a number of USB ports. This docking station may include USB hub circuitry coupled to one or more USB receptacles or other connectors. An example is shown in the following figure.

Figure 19:
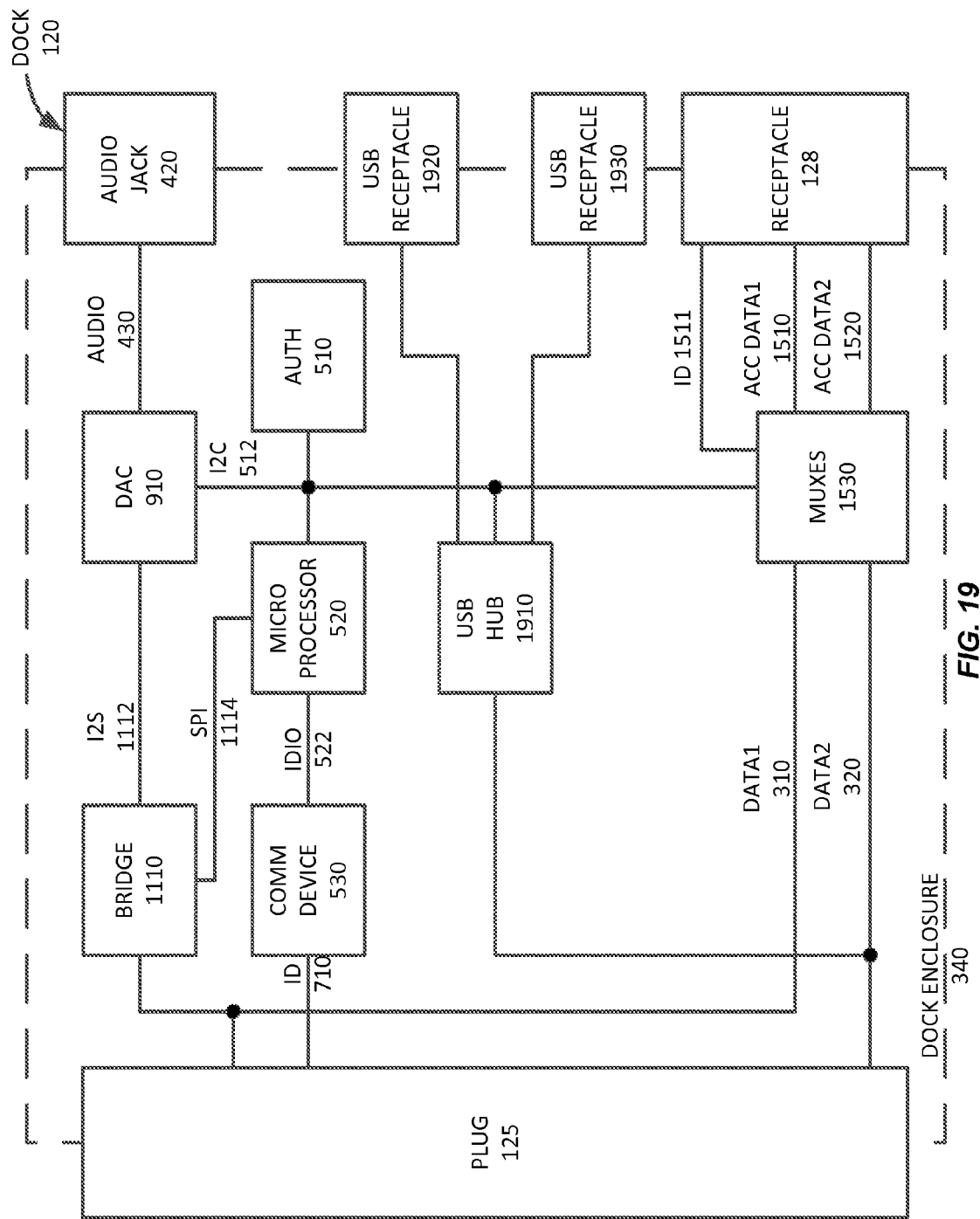
FIG. 19 illustrates a docking station that includes a USB hub according to an embodiment of the present invention.

FIG. 19 illustrates a docking station that includes a USB hub according to an embodiment of the present invention. In this example, docking station input and output devices 1710 and docking station interface 1720, as well as power switch 550, have been omitted for clarity but may be included in various embodiments of the present invention.

USB hub 1910 may be coupled to USB receptacles 1920 and 1930, though in other embodiments of the present invention, docking station 120 may include more or fewer USB receptacles coupled to USB hub 1910. USB hub 1910 may also be in communication with data path DATA2 320. That is, data provided by portable computing device 110 to data path DATA 2 may be provided by USB hub 1910 to either USB receptacle 1910 or 1920, and data received at USB receptacles 1910 or 1920 may be routed through USB hub 1910 to portable computing device 110 via data path DATA2 320. In other embodiments of the present invention, USB hub 1910 may be in communication with data path DATA1 310, or both data paths DATA1 310 and DATA2 320. USB hub 1910 may be at least partially controlled by microprocessor 520 over I2C bus 512, though in other embodiments of the present invention, USB hub may be at least partially controlled by microprocessor 520 over SPI bus 1114, and it may be at least partially controlled by portable computing device 110, accessory 130, or other device.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A docking station comprising:
a housing;
a connector insert located on the housing and arranged to mate with a connector receptacle on a portable computing device;
a second connector to connect to an accessory;
an audio jack located on the housing and arranged to accept an audio plug;
a first data path coupled between the connector insert and the audio jack and further coupled between the connector insert and the second connector; and
a second data path coupled between the connector insert and the second connector.

2. The docking station of claim 1 further comprising a digital-to-analog converter in the first data path between the connector insert and the audio jack, wherein the digital-to-analog converter receives digital audio signals and provides an analog audio signal.

3. The docking station of claim 2 further comprising a bridge circuit located in the first data path between the connector insert and the digital-to-analog converter, wherein the bridge circuit receives data packets and provides digital audio data to the digital-to-analog converter.

4. The docking station of claim 1 wherein the first data path further comprises a branch from the connector insert to the second connector.

5. The docking station of claim 2 wherein the portable computing device comprises a smart phone.

6. The docking station of claim 2 wherein the second connector is located on the housing and comprises a connector receptacle.

7. The docking station of claim 2 wherein the second connector comprises a connector insert and the connector insert connects to the docking station via a cable.

8. The docking station of claim 2 wherein the connector insert comprises a Lightening connector insert.

9. A docking station comprising:
a housing;
a connector insert located on the housing and arranged to mate with a connector receptacle on a portable computing device;
a second connector to connect to an accessory;
a plurality of multiplexers coupled to the second connector;
a first data path coupled between the connector insert and the plurality of multiplexers, the multiplexers to selectively couple contacts in the second connector to the first data path depending on an orientation of a second connector insert inserted into the second connector; and
a second data path coupled between the connector insert and the plurality of multiplexers.

10. The docking station of claim 9 further comprising an audio jack located on the housing and arranged to accept an audio plug, where the first data path is further coupled between the connector insert and the audio jack.

11. The docking station of claim 10 further comprising a digital-to-analog converter coupled between the connector insert and the audio jack, wherein the digital-to-analog converter receives digital audio signals and provides an analog audio signal to the audio jack.

12. The docking station of claim 11 further comprising a bridge circuit located between the connector insert and the digital-to-analog converter, wherein the bridge circuit receives data packets and provides digital audio data to the digital-to-analog converter.

13. The docking station of claim 9 wherein the portable computing device comprises a smart phone.

14. The docking station of claim 9 wherein the second connector is located on the housing and comprises a connector receptacle.

15. The docking station of claim 9 wherein the second connector comprises a connector insert and the connector insert connects to the docking station via a cable.

16. The docking station of claim 9 wherein the connector insert comprises a Lightening connector insert.

17. A docking station comprising:
 a housing;
 a connector insert located on the housing and arranged to mate with a connector receptacle on a portable computing device;
 a second connector to connect to an accessory;
 an audio jack located on the housing and arranged to accept an audio plug;
 a first data path coupled between the connector insert and the second connector and further coupled between the connector insert and the audio jack;
 a second data path coupled between the connector insert and the second connector; and
 an identification path to convey identification and authentication information between the docking station and the portable computing device and coupled between a microprocessor circuit and the connector insert.

18. The docking station of claim 17 further comprising a communication circuit on the identification path and coupled between the connector insert and the microprocessor.

19. The docking station of claim 18 further comprising an authentication circuit to provide authentication information to the portable computing device and coupled to the microprocessor.

20. The docking station of claim 19 wherein the authentication circuit provides authentication data and identification data to the microprocessor.

* * * * *